United States Patent
Buxton et al.

(10) Patent No.: US 7,340,495 B2
(45) Date of Patent: Mar. 4, 2008

(54) SUPERIOR MISALIGNED MEMORY LOAD AND COPY USING MERGE HARDWARE

(75) Inventors: Mark J. Buxton, Chandler, AZ (US); Patrick J. Fay, Apex, NC (US); William W. Macey, Jr., Palo Alto, CA (US); Eric L. Debes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 678 days.

(21) Appl. No.: 10/611,379

(22) Filed: Jun. 30, 2003

(65) Prior Publication Data

US 2004/0098556 A1 May 20, 2004

Related U.S. Application Data

(63) Continuation-in-part of application No. 10/280,511, filed on Oct. 25, 2002, which is a continuation-in-part of application No. 09/952,891, filed on Oct. 29, 2001, now Pat. No. 7,085,795.

(51) Int. Cl.
 *G06F 5/01* (2006.01)
(52) U.S. Cl. ..................................... 708/209
(58) Field of Classification Search ................. 708/209
 See application file for complete search history.

(56) References Cited

U.S. PATENT DOCUMENTS

| | | | |
|---|---|---|---|
| 4,841,468 A | 6/1989 | Miller et al. | |
| 4,982,352 A | 1/1991 | Taylor et al. | |
| 5,566,312 A | * 10/1996 | Pedneau | 711/201 |
| 5,742,755 A | * 4/1998 | Hervin | 714/53 |
| 5,761,491 A | * 6/1998 | Circello et al. | 712/244 |
| 5,781,457 A | 7/1998 | Cohen et al. | |
| 5,909,572 A | 6/1999 | Thayer et al. | |
| 5,933,650 A | 8/1999 | van Hook et al. | |

(Continued)

FOREIGN PATENT DOCUMENTS

EP 0 130 380 A2 1/1985

(Continued)

OTHER PUBLICATIONS

Avaro, Olivier, et al., *MPEG-4 Systems Overview and Architecture*, woody.imag.fr/MPEG4/syssite/syspub/docs/tutorial/, May 28, 1998, pp. 1-71 plus Yahoo site ref.

(Continued)

*Primary Examiner*—D. H. Malzahn
(74) *Attorney, Agent, or Firm*—Blakely, Sokoloff, Taylor & Zafman LLP

(57) ABSTRACT

Method, apparatus, and program means for performing misaligned memory load and copy using aligned memory operations together with a SIMD merge instruction. The method of one embodiment comprises determining whether a memory operation involves a misaligned memory address. The memory operation is performed with aligned memory accesses if the memory operation is determined as not involving a misaligned memory address. The memory operation is performed with an algorithm including a merge operation and aligned memory accesses if the memory operation is determined as involving a misaligned memory address.

52 Claims, 23 Drawing Sheets

U.S. PATENT DOCUMENTS

| | | | |
|---|---|---|---|
| 5,969,975 | A | 10/1999 | Glass et al. |
| 6,115,812 | A | 9/2000 | Abdallah et al. |
| 6,148,302 | A * | 11/2000 | Beylin et al. ............... 707/102 |
| 6,167,419 | A | 12/2000 | Saishi et al. |
| 6,167,420 | A | 12/2000 | Saishi et al. |
| 6,211,892 | B1 | 4/2001 | Huff et al. |
| 6,370,559 | B1 | 4/2002 | Hoffman |
| 6,430,684 | B1 | 8/2002 | Bosshart |
| 6,457,036 | B1 | 9/2002 | Sloan |
| 6,745,319 | B1 | 6/2004 | Balmer et al. |
| 6,839,728 | B2 | 1/2005 | Pitsianis et al. |
| 7,069,470 | B2 * | 6/2006 | Wilding et al. ............... 714/34 |
| 2001/0016902 | A1 | 8/2001 | Abdallah et al. |
| 2002/0159529 | A1 | 10/2002 | Wang et al. |
| 2002/0172287 | A1 | 11/2002 | Kim |
| 2003/0231711 | A1 | 12/2003 | Zhang et al. |
| 2004/0098556 | A1 | 5/2004 | Buxton et al. |
| 2004/0098567 | A1 | 5/2004 | Hansen et al. |
| 2004/0205323 | A1 | 10/2004 | Hansen et al. |
| 2005/0108312 | A1 | 5/2005 | Chen et al. |

FOREIGN PATENT DOCUMENTS

| | | |
|---|---|---|
| EP | 0 363 176 A2 | 4/1990 |
| WO | WO 03/038601 A1 | 5/2003 |

OTHER PUBLICATIONS

Bierling, M., *Displacement Estimation by Hierarchical Blockmatching*, SPIE, vol. 1001, Visual Communications and Image Processing, May 1998, pp. 942-951.

Chan, Y.L and W.C. Siu, *Adaptive Multiple-Candidate Hierarchical Search for Block Matching Algorithm*, IEE Electronics Letters, vol. 31, No. 19, Sep. 14, 1995, pp. 1637-1639.

Chan, Yui-Lam and Wan-Chi Siu, *New Adaptive Pixel Decimation for Block Motion Vector Estimation*, IEEE Transactions on Circuits and Systems on Video Technology, vol. 6, No. 1, Feb. 1996, pp. 113-118.

Chen, Liang-Gee, Wai-Ting Chen, Yeu-Shen Jehng Tzi-Dar Chuieh, *An Efficient Parallel Motion Estimation Algorithm for Digital Image Processing*, IEEE Transactions on Circuits and Systems on Video Technology, vol. 1, No. 4, Dec. 1991, pp. 378-384.

Cheng, K.W., S.C. Chan, *Fast Block Matching Algorithms for Motion Estimation*, ICASSP96, 1996, pp. 2318ff.

Corbal, Jesus, et al., *DLP+TLP Processors for the Next Generation of Media Workloads*, 0-7695-1019-1/01, IEEE, 2001, pp. 219-228.

Day, Neil, Ed., *Introduction to MPEG-7* (v.3.0), International Organization for Standardization, ISO/IEC JTC1/SC29/WG11, Coding of Moving Pictures and Audio, #N4032, Mar. 2001, pp. 1-10.

Diffendorff, Keith, et al. *AltiVec Extension to PowerPC Accelerates Media Processing*, IEEE Publication No. 0272-1732/00, Copyright 2000 IEEE, pp. 85-95.

Dufaux, Frederic, et al., *Efficient, Robust, and Fast Global Motion Estimation for Video Coding*, 1057-7149/00, IEEE, 2000, pp. 497-501.

Eckart, Stefan, Chad Fogg, *ISO/IEC MPEG-2 Software Video Codec*, SPIE vol. 2419, Digital Video Compression: Algorithms and Technologies, 1995, San Jose, CA.

Edirisinghe, E.A., et al., *Shape Adaptive Padding for MPEG-4*, 0098 3063/00, IEEE, 2000, pp. 514-520.

Feng, J., Lo, K. T. Mehrpour, H. Karbowiak, A.E., *Adaptive Block-Matching Motion Estimation Algorithm for Video Coding*, IEE Electronics Letters, vol. 31, No. 18, 1995, pp. 1542-1543.

Furht, Botho, Joshua Greenberg, Raymond Westwater, *Motion Estimation Algorithm for Video Compression*, Kluwer Academic Publishers, Boston, 1997, pp. cover-vi, 11, 49-95.

Ghanbari, M., *The Cross-Search Algorithm for Motion Estimation*, IEEE Transactions on Communications, vol. 38, No. 7, Jul. 1990, pp. 950-953.

He, Zhongli, M.L. Liou, *A High Performance Fast Search Algorithm for Block Matching Motion Estimation*, IEEE Transactions on Circuits and Systems on Video Technology, vol. 7, No. 5, Oct. 1997, pp. 826-828.

He, Zhong-Li, M.L. Liou, *Design of Fast Motion Estimation Algorithm based on Hardware Consideration*, IEEE Transactions on Circuits and Systems on Video Technology, vol. 7, No. 5, Oct. 1997, pp. 819-823.

Heising, G., et al., *MoMuSys: MPEG-4 Version 2 Video Reference Software Package*, AC098/HHI/WP5.1/DS/P/049/B1, 1998, Abstract and pp. 1-8.

Intel Corporation, *Block-Matching in Motion Estimation Alforithms Using Streaming SIMD Extensions 2* (SSE2), Vers. 2.0 Sep. 22, 2000, Order No. 248605-001, pp. 1-13, A-1, A-2.

International Organisation For Standardisation, *Optimization Model Version 2.0*, ISO/IEC JTC1/SC29/WG11, Coding of Moving Pictures and Audio, #N3675, Oct. 2000, 12 pp.

International Organisation For Standardisation, *New MPEG-4 Profiles Under Consideration*, ISO/IEC JTC1/SC29/WG11, Coding of Moving Pictures and Audio, #N3932, Jan. 2001, pp. 1-35.

Jain, J., A. Jain, *Displacement Measurement and its Application in Interframe Image Coding*, IEEE Transactions on Communications, vol. 29, No. 12, Dec. 1981, pp. 1799-1808.

Ju, John C.-H., et al., *A Fast Rate-Optimized Motion Estimation Algorithm for Low-Bit-Rate Video Coding*, 1051-8215/99, IEEE, 1999, pp. 994-1002.

Jung, Hae Mook, Duch Dong Hwang Coong Soo Park, Han Soo Kim, *An Annular Search Algorithm for Efficient Motion Estimation*, International Picture Coding Symposium, PCS96, 1996, pp. 171-174.

Kappagantula, S., K.R. Rao, *Motion Compensated Interframe Image Prediction*, IEEE Transactions on Communications, 33(9), Sep. 1985, pp. 1011-1015.

Kim, Joon-Seek, Rae-Hong Park, *A Fast Feature-Based Block Matching Algorithm Using Integral Projections*, IEEE Journal on Selected areas in communications, vol. 10, No. 5, Jun. 1992, pp. 968-971.

Kim, Michelle, Ed., *MPEG-4 Systems*, International Organization for Standardization, ISO/IEC JTC1/SC29/WG11, Coding of Moving Pictures and Audio #N3383, Jun. 2000, pp. 1-19.

Kneip, Johannes, et al., *Applying and Implementing the MPEG-4 Multimedia Standard*, 0272-1732/99, IEEE, 1999, pp. 64-74.

Kneip, J. (Johannes), et al., *The MPEG-4 Video Coding Standard—a VLSI Point of View*, IEEE Workshop on Signal Processing Systems (SIPS98), Oct. 8-10, 1998, pp. 43-52, A-1, A-2.

Koga, J., et al., *Motion Compensated Interframe Coding for Video Conferencing*, Proceedings of the National Telecommunications Conference, 1981, pp. G5.3.1-5.3.3.

Koenen, Rob, Ed., *Overview of the MPEG-4 Standard*, International Organization for Standardization, ISO/IEC JTC1/SC29/WG11, Coding of Moving Pictures and Audio, #N4030, Mar. 2001, pp. 1-69.

Kuhn, P., *Algorithms, Complexity Analysis and VLSI Architectures for MPEG-4 Motion Estimation*, 1999 Kluwer Academic Publishers, Boston, pp. cover-vi, 15, 17-59, 107-109, 119-121, 147-167, and 189-204.

Kuhn, P., Stechele W., *Complexity Analysis of the Emerging MPEG-4 Standard as a Basis for VLSI Implementation*, vol. SPIE 3309 Visual Communications and Image Processing, San Jose, Jan. 1998, pp. 498-509.

Lee, Liang-Wei, Jhing-Fa Wang, Jau- Yien Lee, Jung-Dar Shie, *Dynamic Search-Window Adjustment and Interlaced Search Block-Matching Algorithm*, IEEE Transactions on circuits and systems for video technology, vol. 3, No. 1, Feb. 1993, pp. 85-87.

Lee, W., Y. Kim, R.J. Gove, C.J. Read, *Media Station 5000: Integrating Video and Audio*, IEEE Multimedia, vol. 1, No. 4, 1994, pp. 50-61.

Lee, Xiaobing, Ya-Qin Zhang, *A Fast Hierarchical Motion-Compensation Scheme for Video Coding Using Block-Feature Matching*, IEEE Transactions on Circuits and Systems for Video Technology, vol. 6, No. 6, Dec. 1996, pp. 627-635.

Lengwehasatit, Krisda, et al., *A Novel Computationally Scalable Algorithm for Motion Estimation*, SPIE 3309 VCIP Visual Communications and Image processing, San Jose, CA, Jan. 1998, pp. 66-79.

Li, R., B. Zeng, M.L. Liu, *A New Three-Step Search Algorithm for Block Motion Estimation*, IEEE Transactions on Circuits and Systems on Video Technology, vol. 4, No. 4, Aug. 1994, pp. 438-442.

Li, W., E. Salari, *Successive Elimination Algorithm for Motion Estimation*, IEEE Trans. Image Processing, vol. 4, Jan. 1995, pp. 105-107.

Liang, Jie, et al., *Region-Based Video Coding with Embedded Zero-Trees*, 1068-0314/97, IEEE, 1997, p. 449.

Liu, B., A. Zaccarin, *New Fast Algorithms for the Estimation of Block Motion Vectors*, IEEE Transactions on Circuits and Systems on Video Technology, vol. 3, No. 2, Apr. 1993, pp. 148-157.

Liu, Lurng-Kuo, Ephraim Feig, *A Block-Based Gradient Descent Search Algorithm for Block-Based Motion Estimation in Video Coding*, IEEE Transactions on Circuits and Systems on Video Technology, vol. 6, No. 4, Aug. 1996, pp. 419-422.

Sikora, Thomas, *MPEG Digital Video Coding Standards*, Preprint from Digital Consumer Electronics Handbook, 1st Ed., McGraw-Hill Book Co., Ch. 9, pp. 1-43, Sep. 1997.

Sikora, Thomas, *MPEG-1 and MPEG-2 Digital Video Coding Standards*, Preprint from Digital Consumer Electronics Handbook, 1st Ed., McGraw-Hill Book Co., pp. 1-43, Sep. 1997.

Sikora, Thomas, *The Structure of the MPEG-4 Video Coding Algorithm*, Preprint from Digital Consumer Electronics Handbook, 1st Ed., McGraw-Hill Book Co., pp. 1-16, Jun. 1996.

Song, Byung Cheol, Jong Beom Ra, *A Hierarchical Block Matching Algorithm Using Partial Distortion Criteria*, SPIE 3309 VCIP Visual Communications and Image Processing, 1998, San Jose, CA, pp. 88-95.

Srinivasan, Ram and K.R. Rao, *Predictive Coding Based on Efficient Motion Estimation*, IEEE Transactions on Circuits and Systems on Video Technology, vol. Com-33, No. 8, Aug. 1985, pp. 888-896.

Stolberg, H.-J., et al., *The M-Pire MPEG-4 Codec DSP and Its Macroblock Engine*, 0-7803-548206/99, IEEE, 2000, pp. II-192-II-195.

Tham, Jo Yew, et al., *Transactions Letters: A Novel Unrestricted Center-Biased Diamond Search Algorithm for Block Motion Estimation*, IEEE, 1051-8215/98, 1998, pp. 369-377.

van der Schaar, M., et al., *Near-Lossless Complexity-Scalable Embedded Compression Algorithm for Cost Reduction in DTV Receivers*, 0098 3063/00, IEEE, 2000, pp. 923-933.

Wang, Chung-Neng, et al., *Improved MPEG-4 Visual Texture Coding Using Double Transform Coding*, 0-7803-6685-9/01, IEEE, 2001, pp. V-227-V-230.

Westerink, P. H., et al., *Two-Pass MPEG02 Variable-Bit-Rate Encoding*, IBM J. Res. Develop, vol. 43, No. 4, Jul. 1999, pp. 471-488.

Wittenburg, J.P., et al., *HiPAR-DSP: A Parallel VLIW RISC Processor for Real Time Image Processing Applications*, (0-7803-4229-1/97) IEEE, 1997, pp. 155-162.

Xu, Jie-Bin, Lai-man Po, and Chok-Kwan Cheung, *A New Prediction Model Search Algorithm for Fast Block Motion Estimation*, IEEE Int. Conf. Image Processing, ICIP97, Santa Barbara, 1997.

Yu, Fengqi and Alan N. Willson, Jr., *A Flexible Hardware-Oriented Fast Algorithm for Motion Estimation*, ICASSP97, 1997, pp. 2681ff.

Zhu, Shan, Kai-Kuang Ma, *A New Diamond Search Algorithm for Fast Block Matching*, IEEE Transactions on Circuits and Systems on Video Technology, vol. 9, No. 2, Feb. 2000, pp. 287-290.

PCT International Search Report for PCT International Application US03/33086, mailed Oct. 28, 2004 (7 pgs).

Mo, Hyeon-Cheol, et al., *A High-Speed Pattern Decoder in MPEG-4 Padding Block Hardware Accelerator*, 0-7803-6685-9/01, IEEE, 2001, pp. II-197 - II-200.

Moschetti, F., et al., *About Macroblock Subsampling for Motion Estimation on IA-64*, Proc. of 2001 IEEE Int'l. Conf. on Multimedia and Expo (ICME 2001), Tokyo, Japan, Aug. 2001, 4 pp.

Moschetti, F., et al., *A Fast Block Matching for SIMD Processors Using Subsampling*, IEEE #0-7803-5482-6/99, pp. IV-321 - IV-324, May 2000.

Nam, Kwon Moon, Joon-Seek Kim, Rae-Hong Park, Young Serk Shim, *A Fast Hierarchical Motion Vector Estimation Algorithm Using Mean Pyramid*, IEEE Transactions on Circuits and Systems on Video Technology, vol. 5, No. 4, Aug. 1995, pp. 344-351.

Netravali, A., B. Haskell, *Digital Pictures Representation and Compression*, New York, Plenum, 1988, pp. cover-xv, 334-340, 537-542, and 354-355.

Pirsch, Peter, Nicolas Demassieux, Winfried Gehrke, *VLSI Architectures for Video Compression - A Survey*, Proceedings of the IEEE, vol. 83, No. 2, Feb. 1995, pp. 220-246.

Po, Lai-Man, Wing-Chung Ma, *A Novel Four-Step Search Algorithm for Fast Blockmatching*, IEEE Transactions on Circuits and Systems on Video Technology, vol. 6, No. 3, Jun. 1996, pp. 313-317.

Puri, A., H.M. Hang, D.L. Schilling, *An Efficient Blockmatching Algorithm for Motion Compensated Coding*, Proc. IEEE ICASSP, 1987, pp. 2.4.1-25.4.4.

Ragsdale, Gary L., et al., *Relationships of Popular Transmission Characteristics to Perceived Quality for Digital Video Over ATM*, National Communications System, Technical Information Bulletin 99-2, Jan. 1999, 64 pp.

Ramkishor, K., et al., *Real Time Implementation of MPEG-4 Video Decoder on ARMTTDMI*, Proc. of 2001 Int'l, Symposium on Intelligent Multimedia, Video and Speech Processing, May 2-4, 2001, pp. 522-526.

Shi, Y.Q., X, Xia, *A Thresholding Multiresolution Block Matching Algorithm*, IEEE Transactions on Circuits and Systems on Video Technology, vol. 7, No. 2, Apr. 1997, pp. 437-440.

\* cited by examiner

FIG. 3B

Packed Half (341): HALF 0 [0-15], HALF 1 [16-31], HALF 2 [32-47], HALF 3 [48-63], HALF 4 [64-79], HALF 5 [80-95], HALF 6 [96-111], HALF 7 [112-127]

Packed Single (342): SINGLE 0 [0-31], SINGLE 1 [32-63], SINGLE 2 [64-95], SINGLE 3 [96-127]

Packed Double (343): DOUBLE 0 [0-63], DOUBLE 1 [64-127]

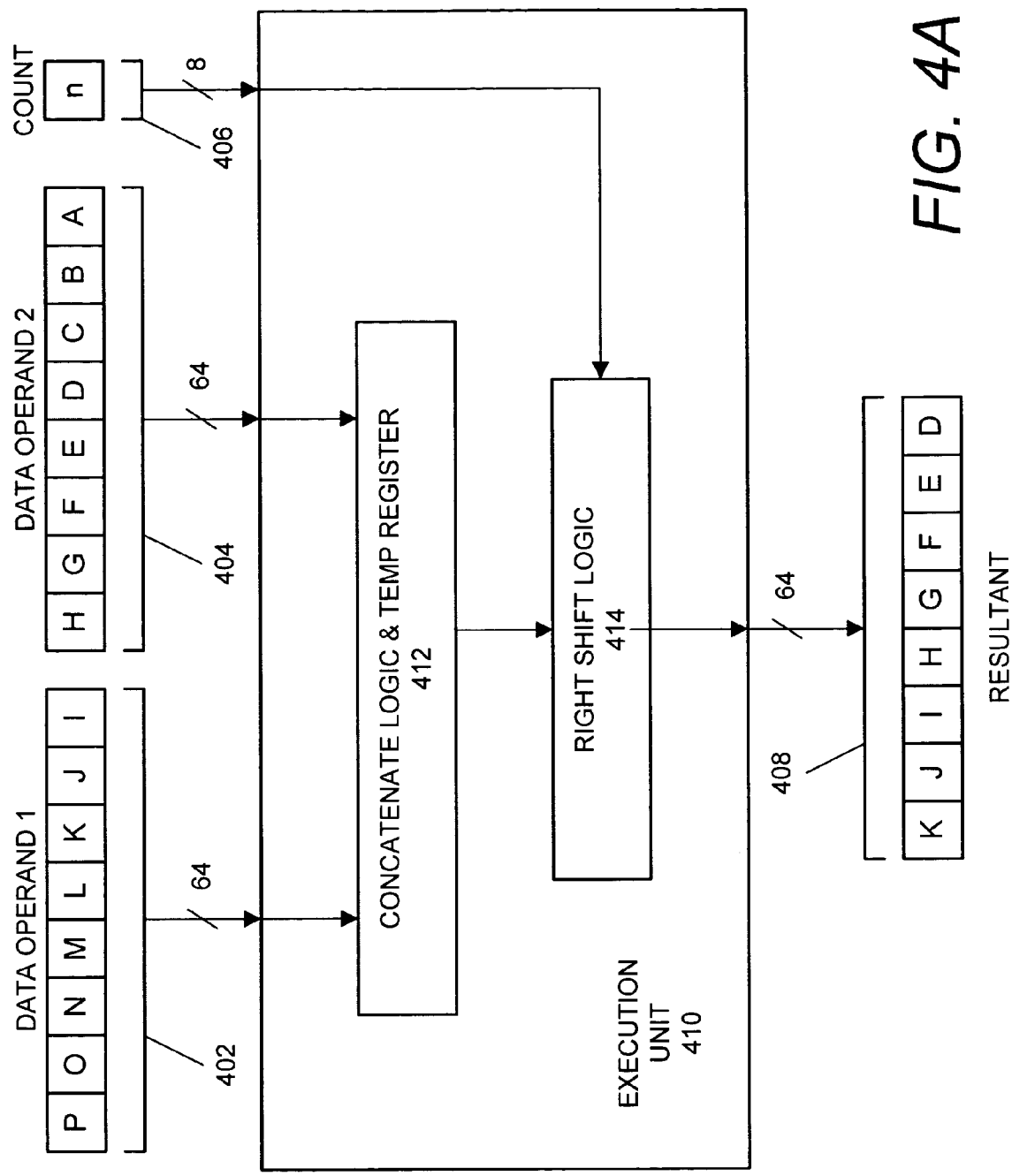

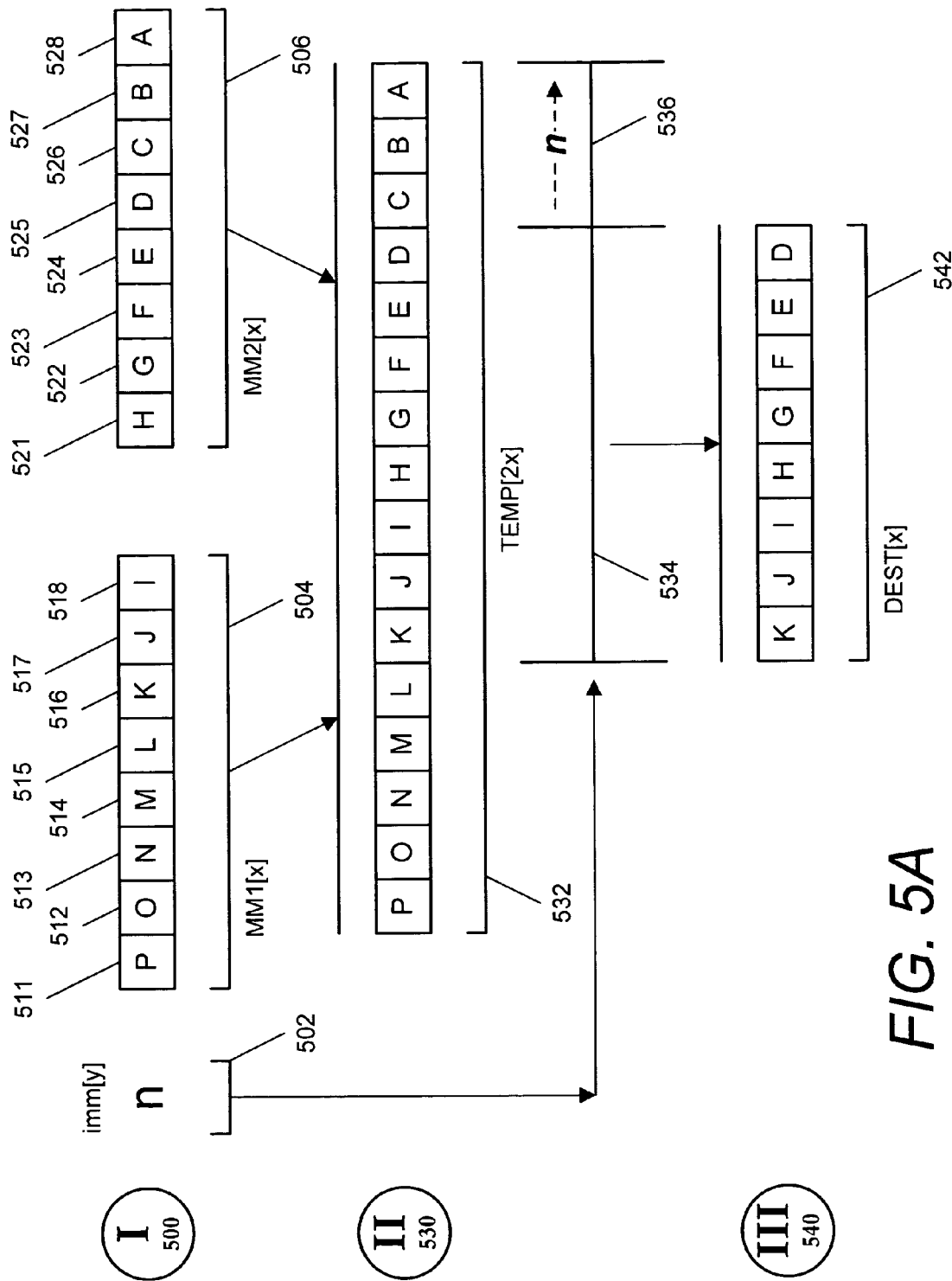

SUPERIOR MISALIGNED MEMORY LOAD AND COPY USING MERGE HARDWARE

This patent application is a Continuation In Part of U.S. patent application Ser. No. 10/280,511, entitled "Method And Apparatus For Parallel Shift Right Merge Of Data", filed Oct. 25, 2002, which is a Continuation In Part of U.S. patent application Ser. No. 09/952,891, entitled "An Apparatus And Method For Efficient Filtering And Convolution Of Content Data", filed Oct. 29, 2001, now U.S. Pat. No. 7,085,795.

FIELD OF THE INVENTION

The present disclosure pertains to the field of processing apparatuses and associated software and software sequences that perform mathematical operations.

DESCRIPTION OF RELATED ART

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

As processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing experience will be even richer in audio-visual effects, as well as being easier to use, and more importantly, computing will merge with communications.

Accordingly, the display of images, as well as playback of audio and video data, which is collectively referred to as content, have become increasingly popular applications for current computing devices. Filtering and convolution operations are some of the most common operations performed on content data, such as image audio and video data. Such operations are computationally intensive, but offer a high level of data parallelism that can be exploited through an efficient implementation using various data storage devices, such as for example, single instruction multiple data (SIMD) registers. A number of current architectures also require unnecessary data type changes which minimizes instruction throughput and significantly increases the number of clock cycles required to order data for arithmetic operations.

In communicating various types of data, especially for motion and audio/video, compression and encoding is heavily used to reduce the enormous amount of data to something more manageable. If the code is comprised of fixed length pieces, an algorithm for decoding and handling the code can be optimized as the code pieces are predictable. However, with variable length codes, the situation is more complex. The code for each symbol has to be properly recognized and decoded. Additional complexities are also introduced with variable length codes due to the bit granularity of symbols and the large possibility that these symbols do not align with a more manageable byte boundary.

BRIEF DESCRIPTION OF THE FIGURES

The present invention is illustrated by way of example and not limitation in the Figures of the accompanying drawings, in which like references indicate similar elements.

FIG. 3B illustrates packed data-types in accordance with an alternative embodiment;

FIG. 4A is a block diagram of one embodiment of logic to perform a SIMD parallel shift merge operation on data operands in accordance with the present invention;

FIG. 5A illustrates the operation of a parallel shift merge instruction in accordance with a first embodiment of the present invention;

DETAILED DESCRIPTION

Figure 1A:
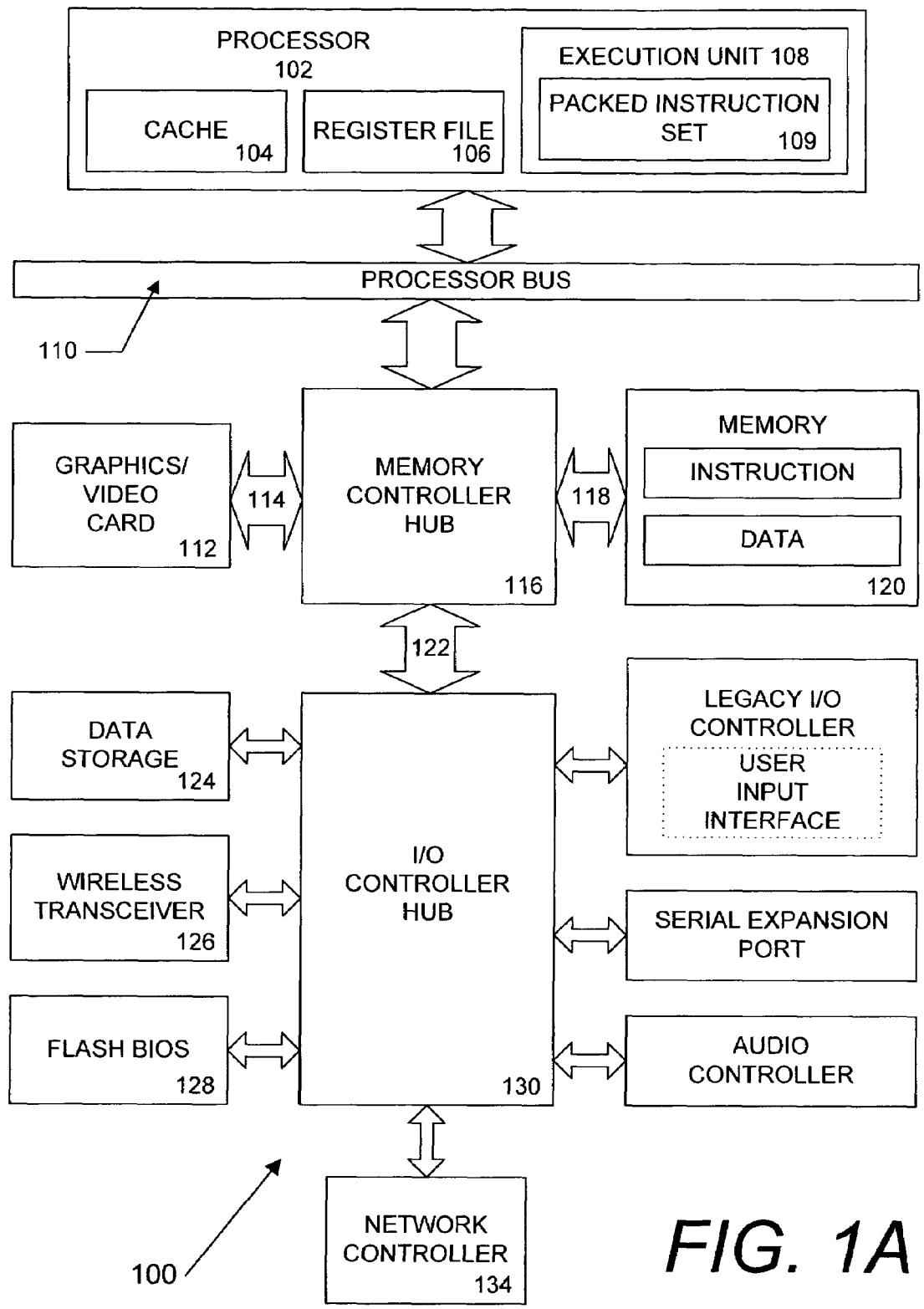
FIG. 1A is a block diagram of a computer system formed with a processor that includes execution units to execute a SIMD instruction for a parallel shift merge operation in accordance with one embodiment of the present invention.

The following description describes embodiments of a superior misaligned memory load and copy using merge hardware. In the following description, numerous specific details such as processor types, micro-architectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. However, the present invention is not limited to processors or machines that perform 256 bit, 128 bit, 64 bit, 32 bit, or 16 bit data operations and can be applied to any processor and machine in which manipulation of packed data is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

Although the below examples describe instruction handling and distribution in the context of execution units and logic circuits, other embodiments of the present invention can be accomplished by way of software. In one embodiment, the methods of the present invention are embodied in machine-executable instructions. The instructions can be used to cause a general-purpose or special-purpose processor that is programmed with the instructions to perform the steps of the present invention. The present invention may be provided as a computer program product or software which may include a machine or computer-readable medium having stored thereon instructions which may be used to program a computer (or other electronic devices) to perform a process according to the present invention. Alternatively, the steps of the present invention might be performed by specific hardware components that contain hardwired logic for performing the steps, or by any combination of programmed computer components and custom hardware components. Such software can be stored within a memory in the system. Similarly, the code can be distributed via a network or by way of other computer readable media.

Thus a machine-readable medium may include any mechanism for storing or transmitting information in a form readable by a machine (e.g., a computer), but is not limited to machine readable storage medium (e.g., floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory), and machine transmission medium (e.g., a transmission over the Internet, electrical, optical, acoustical or other forms of propagated signals (e.g., carrier waves, infrared signals, digital signals, etc.) or the like). Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Misaligned memory copies and loads/stores negatively impact system performance. The overall performance of both hardware and software can drop significantly when a large number of source and destination addresses are not aligned along memory boundaries. Even though such boundary misalignments are undesirable, misalignments still happen very frequently in real applications, such as SpecJBB for example, despite efforts to avoid these situations. Similar misalignment issues can also exist in string copy algorithms. The loading of unaligned data in SIMD applications is also quite common. For instance, variable length data values that are not boundary aligned are often loaded from library code. Unaligned data can also cause difficulties for memory copy operations and to compilers during vectorization. The vectorization or parallelization of code by a vectorizing compiler frequently encounters poorly aligned data. Although "unaligned load" instructions are available, these instructions are still costly in terms of performance and code size.

The negative performance impact can be attributed to a variety of factors. For instance, there is overhead attributed to the detection and handling of misaligned address scenarios via separate code routines. Similarly, clock cycles are spent performing redundant loading of source data in order to obtain aligned destination data. In some cases, 'shift and logical OR' operations can be used to obtain source data without redundant loads. However, different overhead costs are incurred due to the infinite dependency chains involved with 'shift and logical OR' algorithms.

Presently, a number of instructions are needed in order to perform memory copy/move operations at memory addresses misaligned with memory boundaries. This can be especially tedious in cases where the amount of data involved are of length. The use of a SIMD shift merge type of instruction to enable the use of aligned memory accesses can help reduce the instruction count and code complexity. For instance, one decoding algorithm to generate the same results without a SIMD shift merge instruction uses more instructions that take up additional processing resources and pipeline slots to perform the functionality and work of a single shift merge instruction. As a result, unaligned memory accesses that does not use a merge type of instruction can often be lengthier in terms of code size and slower in terms of execution. The use of a merge instruction can assist in freeing up resources not only by reducing the instruction count, but by simplifying memory load or copy operations.

Embodiments of the present invention introduce a method for improving unaligned memory loads and stores through the use of a merge operation. One embodiment produces destination alignment by having merge operations realign source and destination specific data. Embodiments of the present invention employ merge instructions and related hardware to perform memory loads and copies from misaligned addresses. By using a merge type of capability, present embodiments can avoid wasting loads and stores as in other solutions. Furthermore, the serial dependencies that can arise in a 'shift and logical OR' approach are also avoided. Embodiments of the merge technique in accordance to the present invention can enable data copies both to and from misaligned addresses to be about as fast as accesses to aligned addresses.

Embodiments of the present invention involve a merge type of operation that extracts a predetermined number of data elements at an arbitrary offset within the memory space formed by two data operands that each have the same predetermined number of data elements. A shift count or offset is provided to execution hardware along with the two data operands when a merge operation is processed. For one embodiment, the merge operation is implemented as a constant merge which takes a predetermined shift count or offset as an argument that cannot be changed at runtime. In other words, the merge offset is determined prior to runtime and possibly even during code development by a designer. For another embodiment, a variable merge that can take a variable offset as an argument is employed. This variable merge instruction includes hardware to receive a dynamic shift count or merge offset at runtime. In other words, the offset does not have to be hard coded with the software program and can be changed at execution time. A variable merge can help simplify the coding of memory copy kernels and other variable misalignment code.

FIG. 1A is a block diagram of an exemplary computer system formed with a processor that includes execution units to execute an instruction for a merge operation in accordance with one embodiment of the present invention. System 100 includes a component, such as a processor 102 to employ execution units including logic to perform algorithms for processing data, in accordance with the present invention, such as in the embodiment described herein. System 100 is representative of processing systems based on the PENTIUM® III, PENTIUM® 4, Xeon™, Itanium®, and/or XScale™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, the present invention is not limited to any specific combination of hardware circuitry and software.

Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs misaligned memory copies or moves. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1A is a block diagram of a computer system 100 formed with a processor 102 that includes one or more execution units 108 to perform an algorithm to handle misaligned memory load/copy requests with aligned memory accesses and merge instructions in accordance with the present invention. For example, the processor 102 can receive program instructions requesting a memory load/copy operation from a misaligned memory address. In processing these instructions, one embodiment of the present invention can invoke the use of an algorithm involving merge operations and aligned memory accesses to process the memory load/copy request. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions.

In one embodiment, the processor 102 includes a Level 1 (L1) internal cache memory 104. Depending on the architecture, the processor 102 can have a single internal cache or multiple levels of internal cache. Alternatively, in another embodiment, cache memory can reside external to the processor 102. Other embodiments can also include a combination of both internal and external caches depending on the implementation. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a packed instruction set 109. In one embodiment, the packed instruction set 109 includes a packed merge instruction for joining together blocks of data. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time. Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute a merge instruction can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
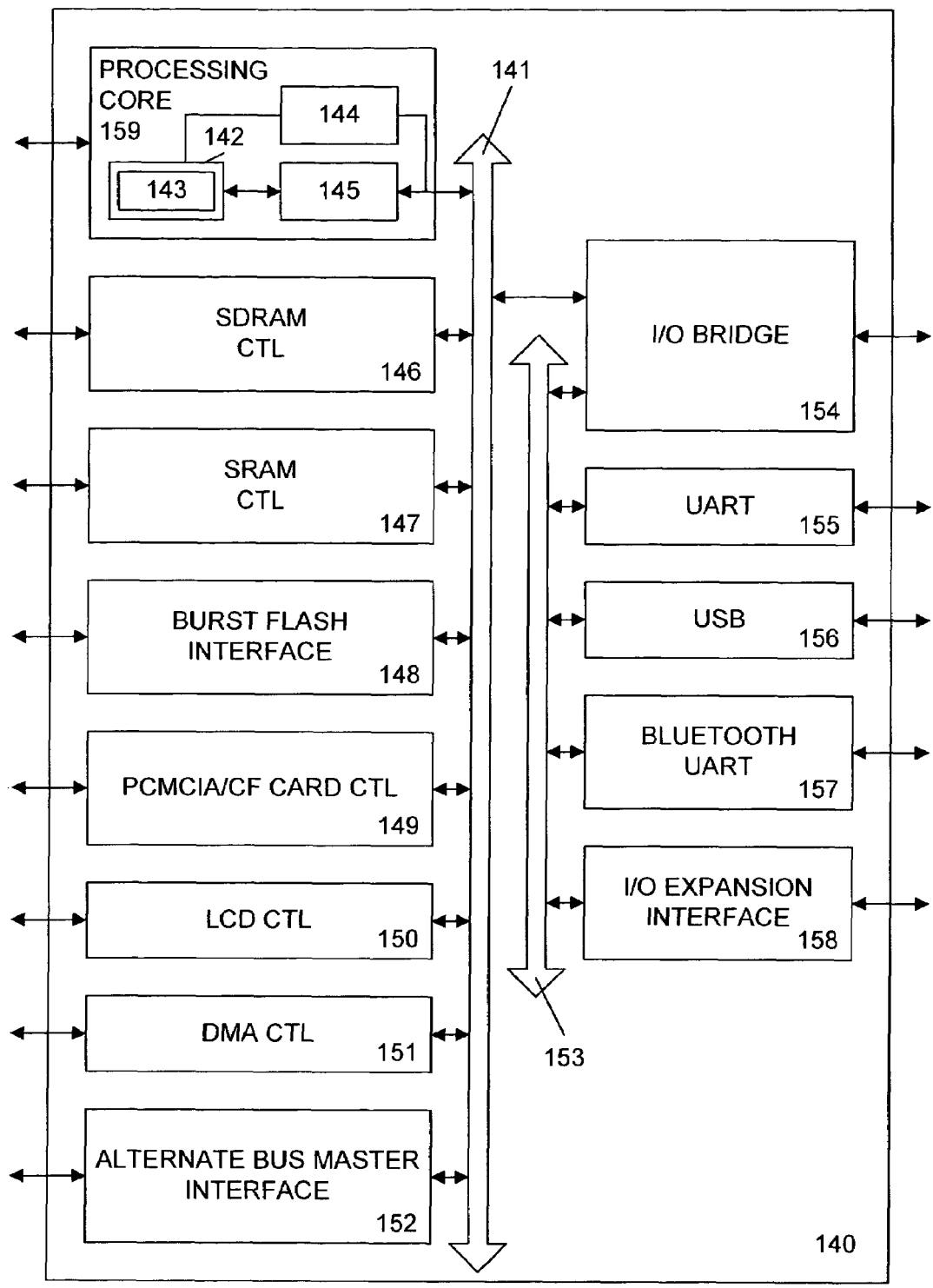
FIG. 1B is a block diagram of another exemplary computer system in accordance with an alternative embodiment of the present invention.

FIG. 1B illustrates an alternative embodiment of a data processing system 140 which implements the principles of the present invention. One embodiment of data processing system 140 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 140 comprises a processing core 159 capable of performing SIMD operations including a shift merge. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize instructions in packed instruction set 143 for performing operations on packed data formats. Packed instruction set 143 includes instructions for supporting data merge operations, and may also include other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMED operations including a shift merge operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
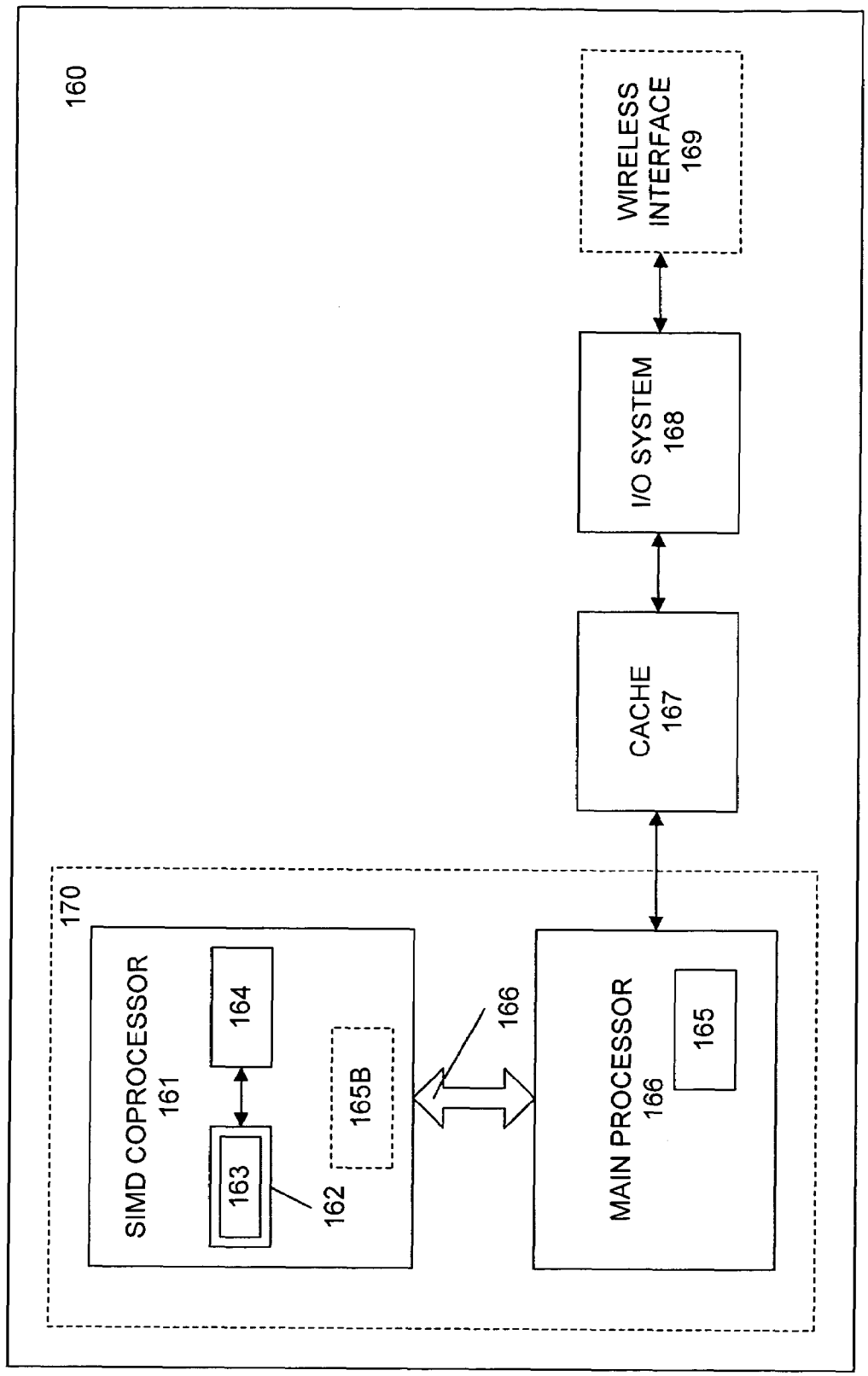
FIG. 1C is a block diagram of yet another exemplary computer system in accordance with another alternative embodiment of the present invention.

FIG. 1C illustrates yet alternative embodiments of a data processing system capable of performing SIMD shift merge operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing SIMD operations including data merges. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including SIMD shift merge instructions for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including SIMD merge instructions.

Figure 2:
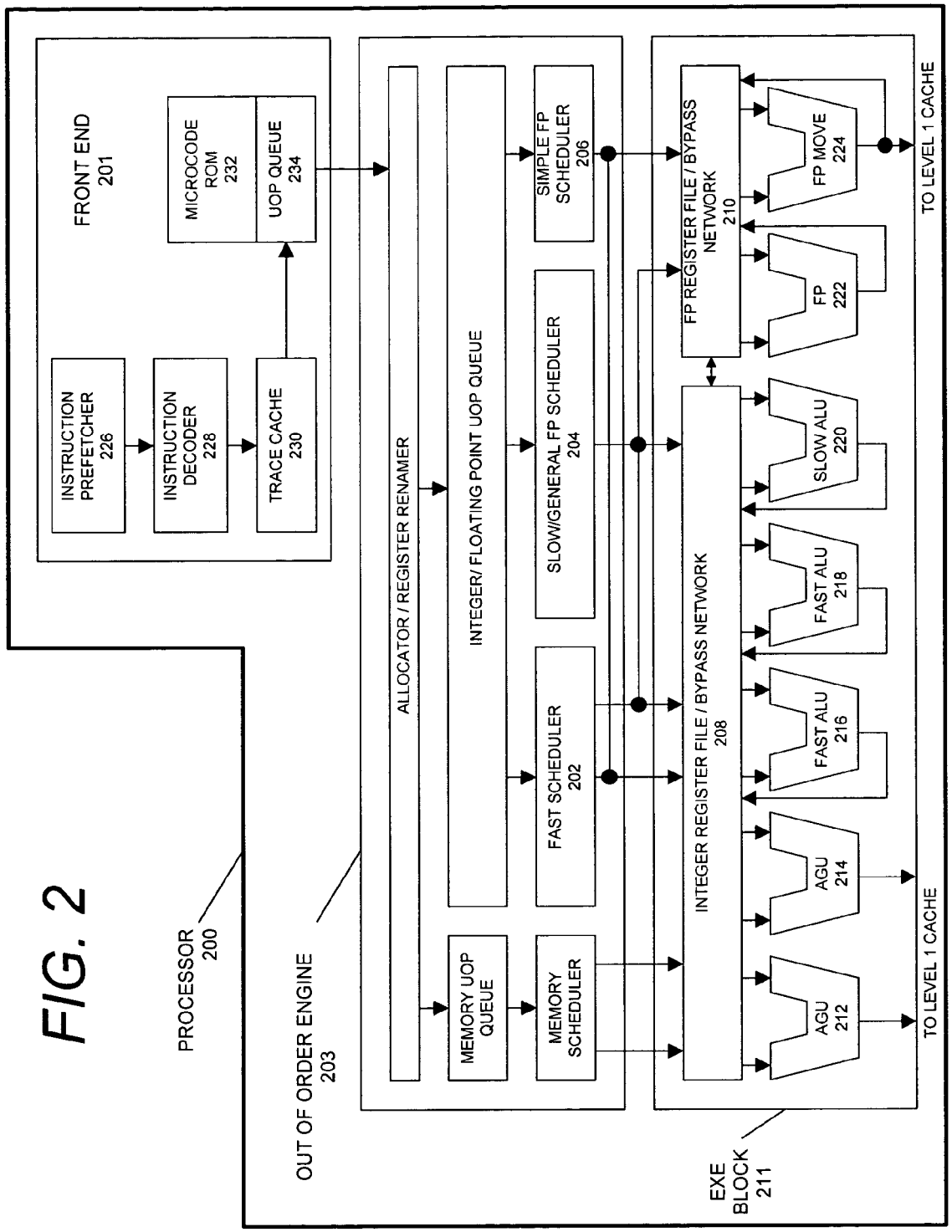
FIG. 2 is a block diagram of the micro-architecture for a processor of one embodiment that includes logic circuits to perform shift merge operations in accordance with the present invention.

FIG. 2 is a block diagram of the micro-architecture for a processor 200 of one embodiment that includes logic circuits to perform a shift merge operation in accordance with the present invention. The merge operation may also be referred to as a register merge operation and register merge instruction. For one embodiment of a merge instruction, the instruction can take data from the two memory blocks, shift one or more data elements out of one block, and append/merge the same number of shifted data elements from the other block to the first block to generate a resultant merged data block. The merge instruction can also be referred to as an align right, PALIGNR. The merge instruction is also referred to as a PALIGNR or PSRMRG or packed shift merge or parallel shift merge in some instances. In this embodiment, the merge instruction can also be implemented to operate on data elements having sizes of byte, word, doubleword, quadword, etc.

The in-order front end 201 is the part of the processor 200 that fetches the macro-instructions to be executed and prepares them to be used later in the processor pipeline. The front end 201 of this embodiment includes several units. The instruction prefetcher 226 fetches macro-instructions from memory and feeds them to an instruction decoder 228 which in turn decodes them into primitives called micro-instructions or micro-operations (also called micro op or uops) that the machine knows how to execute. The trace cache 230 takes decoded uops and assembles them into program ordered sequences or traces in the uop queue 234 for execution. When the trace cache 230 encounters a complex macro-instruction, microcode ROM 232 provides uops needed to complete the operation.

Many macro-instructions are converted into a single micro-op, and others need several micro-ops to complete the full operation. In this embodiment, if more than four micro-ops are needed to complete a macro-instruction, the decoder 228 accesses the microcode ROM 232 to do the macro-instruction. For one embodiment, a merge instruction can be decoded into a small number of micro ops for processing at the instruction decoder 228. In another embodiment, an instruction for a packed shift merge algorithm can be stored within the microcode ROM 232 should a number of micro-ops be needed to accomplish the operation. The trace cache 230 refers to an entry point programmable logic array (PLA) to determine a correct micro-instruction pointer for reading micro-code sequences for merge algorithms in the micro-code ROM 232. After the microcode ROM 232 finishes sequencing micro-ops for the current macro-instruction, the front end 201 of the machine resumes fetching micro-ops from the trace cache 230.

Some SIMD and other multimedia types of instructions are considered complex instructions. Most floating point related instructions are also complex instructions. As such, when the instruction decoder 228 encounters a complex macro-instruction, the microcode ROM 232 is accessed at the appropriate location to retrieve the microcode sequence for that macro-instruction. The various micro-ops needed for performing that macro-instruction are communicated to the out-of-order execution engine 203 for execution at the appropriate integer and floating point execution units.

The out-of-order execution engine 203 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of this embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of this embodiment also includes a bypass network that can bypass or forward just completed results that have not yet been written into the register file to new dependent uops. The integer register file 208 and the floating point register file 210 are also capable of communicating data with the other. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of this embodiment is comprised of a number of execution units: address generation unit (AGU) 212, AGU 214, fast ALU 216, fast ALU 218, slow ALU 220, floating point ALU 222, floating point move unit 224. For this embodiment, the floating point execution blocks 222, 224, execute floating point, MMX, SIMD, and SSE operations. The floating point ALU 222 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider.

On the other hand, non-floating point numbers and integer type are handled with integer hardware resources. The simple, very frequent ALU operations go to the high-speed ALU execution units 216, 218. The fast ALUs 216, 218, of this embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For this embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In this embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed. The independent ones are allowed to complete.

The term "registers" is used herein to refer to the on-board processor storage locations that are used as part of macro-instructions to identify operands. In other words, the registers referred to herein are those that are visible from the outside of the processor (from a programmer's perspective). However, the term registers should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers can operate with packed integer data elements that accompany Intel MMX instructions. Similarly, 128 bits wide XMM registers relating to SSE and SSE2 technology can also be used to hold such packed data operands. In this embodiment, in storing packed floating point data and integer data, the registers do not need to differentiate between the data types.

Figure 3A:
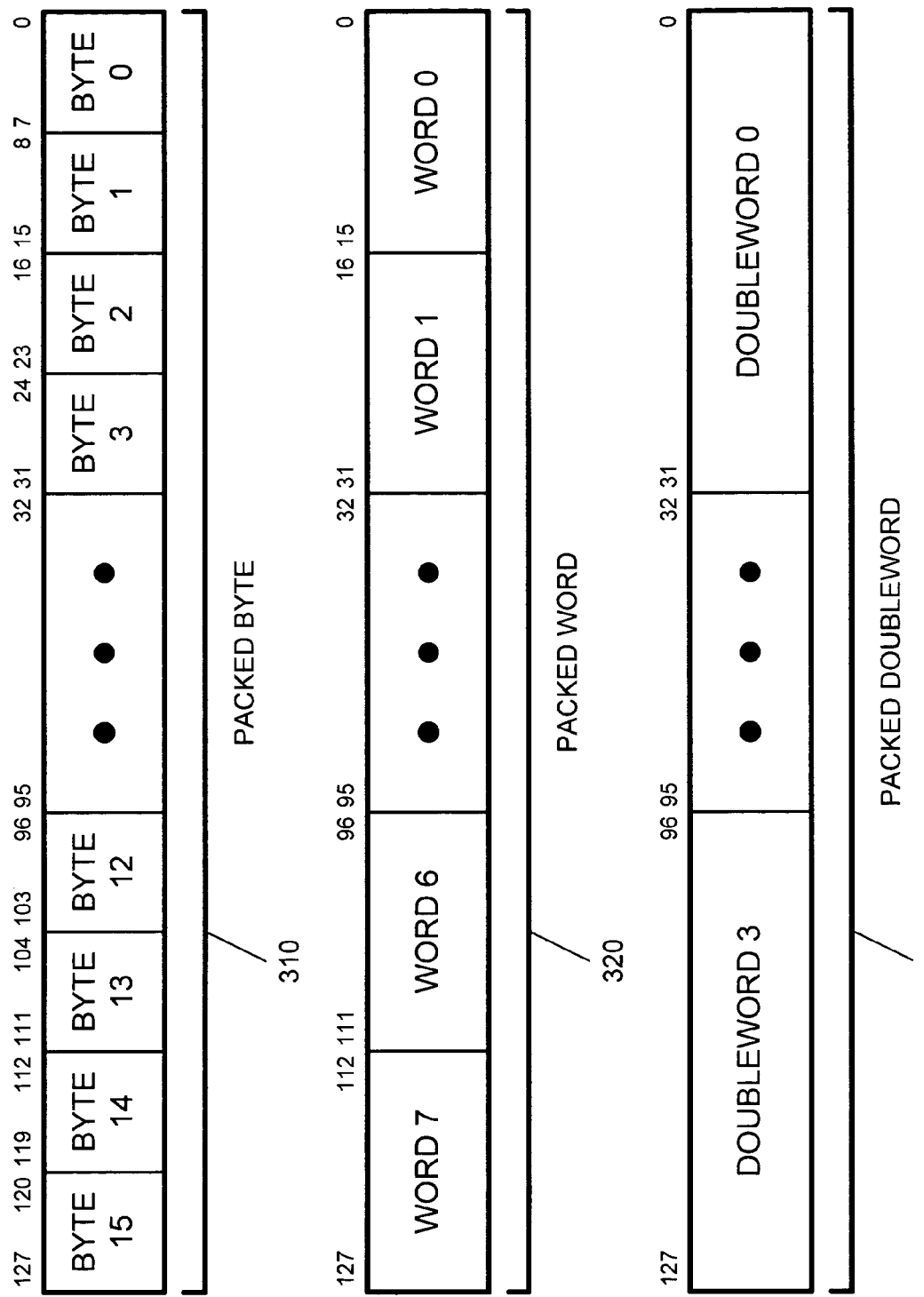
FIG. 3A illustrates various packed data type representations in multimedia registers according to one embodiment of the present invention.

FIG. 3A illustrates various packed data type representations in multimedia registers according to one embodiment of the present invention. FIG. 3A illustrates data types for a packed byte 310, a packed word 320, and a packed doubleword (dword) 330 for 128 bits wide operands. The packed byte format 310 of this example is 128 bits long and contains sixteen packed byte data elements. A byte is defined here as eight bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSE2 technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword element contains thirty two bits of information. A packed quadword is 128 bits long and contains two packed quadword data elements.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

Figure 3C:
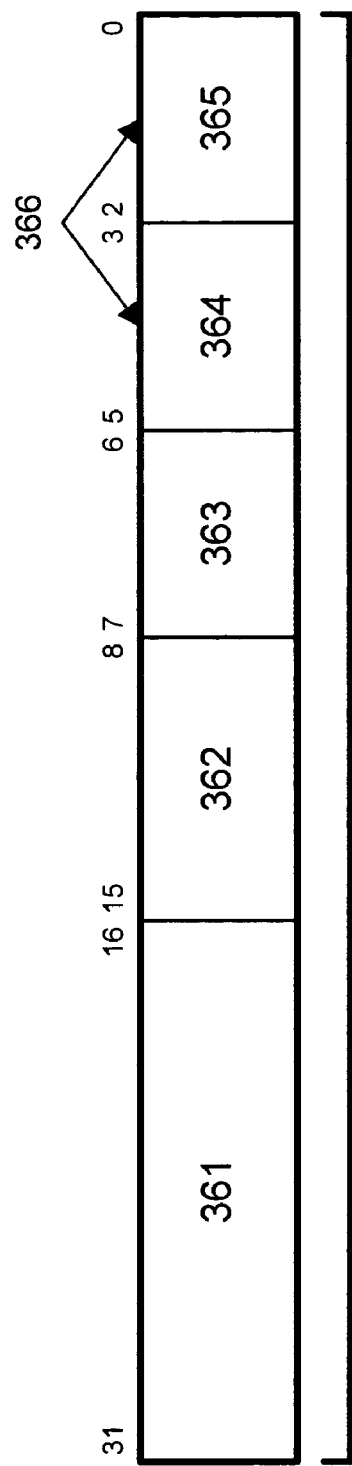
FIG. 3C illustrates one embodiment of an operation encoding (opcode) format for a merge instruction.

FIG. 3C is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. The type of shift merge operation, may be encoded by one or more of fields 361 and 362. Up to two operand locations per instruction may be identified, including up to two source operand identifiers 364 and 365. For one embodiment of the shift merge instruction, destination operand identifier 366 is the same as source operand identifier 364. For an alternative embodiment, destination operand identifier 366 is the same as source operand identifier 365. Therefore, for embodiments of a shift merge operation, one of the source operands identified by source operand identifiers 364 and 365 is overwritten by the results of the shift merge operations. For one embodiment of the shift merge instruction, operand identifiers 364 and 365 may be used to identify 64-bit source and destination operands.

Figure 3D:
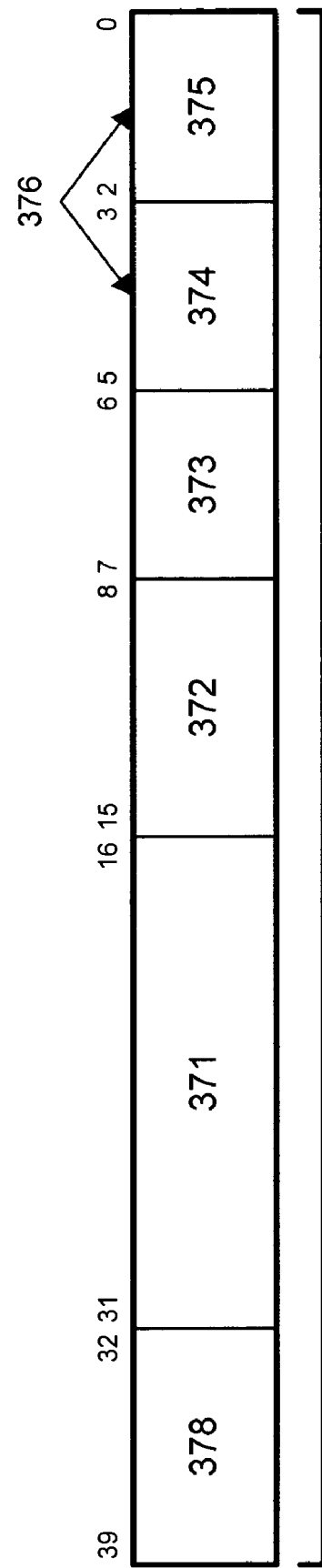
FIG. 3D illustrates an alternative operation encoding format.

FIG. 3D is a depiction of another alternative operation encoding (opcode) format 370, having forty or more bits. Opcode format 370 corresponds with opcode format 360 and comprises an optional prefix byte 378. The type of shift right merge operation, may be encoded by one or more of fields 378, 371, and 372. Up to two operand locations per instruction may be identified by source operand identifiers 374 and 375 and by prefix byte 378. For one embodiment of the merge instruction, prefix byte 378 may be used to identify 128-bit source and destination operands. For one embodiment of the shift merge instruction, destination operand identifier 376 is the same as source operand identifier 374. For an alternative embodiment, destination operand identifier 376 is the same as source operand identifier 375. Therefore, for embodiments of the shift merge operations, one of the source operands identified by source operand identifiers 374 and 375 is overwritten by the results of the shift merge operations. Opcode formats 360 and 370 allow register to register, memory to register, register by memory, register by register, register by immediate, register to memory addressing specified in part by MOD fields 363 and 373 and by optional scale-index-base and displacement bytes.

Figure 3E:
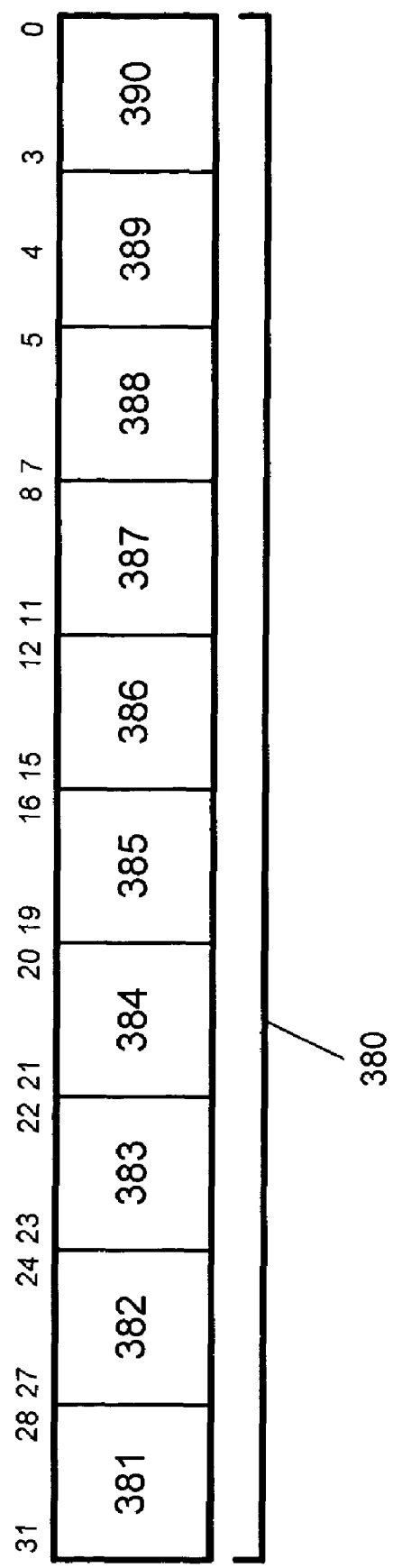
FIG. 3E illustrates yet another alternative operation encoding format.

Turning next to FIG. 3E, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments of shift merge operations, may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, the merge operation is performed on fixed-point or integer data elements. In some embodiments, a merge instruction may be executed conditionally, using condition field 381. For some merge instructions source data sizes may be encoded by field 383. In some embodiments of a shift merge instruction, Zero (Z), negative (N), carry (C), and overflow (V) detection can be done on SIMD fields. For some instructions, the type of saturation may be encoded by field 384.

In the examples of the following figures, a number of data operands are described. For simplicity, the data segments are labeled from letter A onwards alphabetically, wherein A is located at the lowest address and Z would be located at the highest address. Thus, A may be at address 0, B at address 1, C at address 3, and so on. Although the data sequences in some of the examples appear with the letters arranged in reverse alphabetic order, the addressing would still start with A at 0, B at 1, etc. Conceptually, a shift right operation, as in the shift right merge for one embodiment, entails right shifting the lower address data segments out if the sequence is D, C, B, A. Thus, a right shift simply shifts the data elements of a data block to the right past a stationary line. Furthermore, a shift right merge operation can conceptually right shift the rightmost data segments from one operand into the left side of another data operand as if the two operands were on a continuum. Although these examples are described in the context of a shift right merge, other embodiments of the present invention are similarly applicable to a shift left merge. For example, instead of shifting a merged block the number of data element positions as specified by the shift count, alternative embodiments of the present invention can involve the left shifting of the merge block in accordance to the shift count. Similarly, in yet another embodiment, the merge instruction employs shift logic that is capable of shifting to both the left and the right direction as needs.

FIG. 4A is a block diagram of one embodiment of logic to perform a SIMD parallel shift merge operation on data operands in accordance with the present invention. The PALIGNR or PSRMRG instruction for a shift right merge (also, a register shift) operation of this embodiment begins with three pieces of information: a first data operand 402, a second data operand 404, and a shift count 406. In one embodiment, the PALIGNR/PSRMRG shift merge instruction is decoded into one micro-operation. In an alternate embodiment, the instruction may be decoded into a various number of micro-ops to perform the shift merge operation on the data operands. For this example, the data operands 402, 404, are 64 bit wide pieces of data stored in a register (or memory) and the shift count 406 is an 8 bit wide immediate value. Depending on the particular implementation, the data operands and shift count can be other widths such as 128/256 bits and 16 bits, respectively. The first operand 402 in this example is comprised of eight data segments: P, O, N, M, L, K, J, and I. The second operand 404 is also comprised of eight data segments: H, G, F, E, D, C, B, and A. The data segments here are of equal length and each comprise of a single byte (8 bits) of data. However, another embodiment of the present invention operates with longer 128 bit operands wherein the data segments are comprised of a single byte (8 bits) each and the 128 bit wide operand would have sixteen byte wide data segments. Similarly, if each data segment was a double word (32 bits) or a quad word (64 bits), the 128 bit operand would have four double word wide or two quad word wide data segments, respectively. Thus embodiments of the present invention are not restricted to particular length data operands, data segments, or shift counts, and can be sized appropriately for each implementation.

The operands 402, 404 can reside either in a register or a memory location or a register file or a mix. The data operands 402, 404, and the count 406 are sent to an execution unit 410 in the processor along with a shift right merge instruction. By the time the shift right merge instruction reaches the execution unit 410, the instruction should have been decoded earlier in the processor pipeline. Thus the shift right merge instruction can be in the form of a micro operation (uop) or some other decoded format. For this embodiment, the two data operands 402, 404, are received at concatenate logic and a temporary register. The concatenate logic merges or joins the data segments for the two operands and places the new block of data in a temporary register. Here, the new data block is comprised of sixteen data segments: P, O, N, M, L, K, J, I, H, G, F, E, D, C, B, A. As this example is working with 64 bits wide operands, the temporary register need to hold the combined data is 128 bits wide. For 128 bits wide data operands, a 256 bits wide temporary register is needed.

Right shift logic 414 in the execution unit 410 takes the contents of the temporary register and performs a logical shift right of the data block by n data segments as requested by the count 406. In this embodiment, the count 406 indicates the number of bytes to right shift. Depending on the particular implementation, the count 406 can also be used to indicated the number of bits, nibbles, words, double words, quad words, etc. to shift, depending on the granularity of the data segments. For this example, n is equal to 3, so the temporary register contents are shifted by three bytes. If each data segment was a word or double word wide, then the count can indicate the number of words or double words to shift, respectively. For this embodiment, 0's are shifted in from the left side of the temporary register to fill up the vacated spaces as the data in the register is shifted right. Thus if the shift count 406 is greater than the number of data segments in a data operand (eight in this case), one or more 0's can appear in the resultant 408. Furthermore, if the shift count 406 is equal to or exceeds the total number of data segments for both operands, the resultant will comprise of all 0's, as all the data segments will have been shifted away. The right shift logic 414 outputs the appropriate number of data segments from the temporary register as the resultant 408. In another embodiment, an output multiplexer or latch can be included after the right shift logic to output the resultant. For this example, the resultant is 64 bits wide and includes eight bytes. Due to the shift right merge operation on the two data operands 402, 404, the resultant is comprised of the following eight data segments: K, J, I, H, G, F, E, and D. For an alterative embodiment, a left shift merge operation is employed. For example, left shift logic in the execution unit 410 takes the contents of the temporary register and performs a logical shift left of the data block by n data segments as requested by the count 406. In yet another embodiment, the shift logic is capable of shifting to the left or to the right depending on the instruction designation.

Figure 4B:
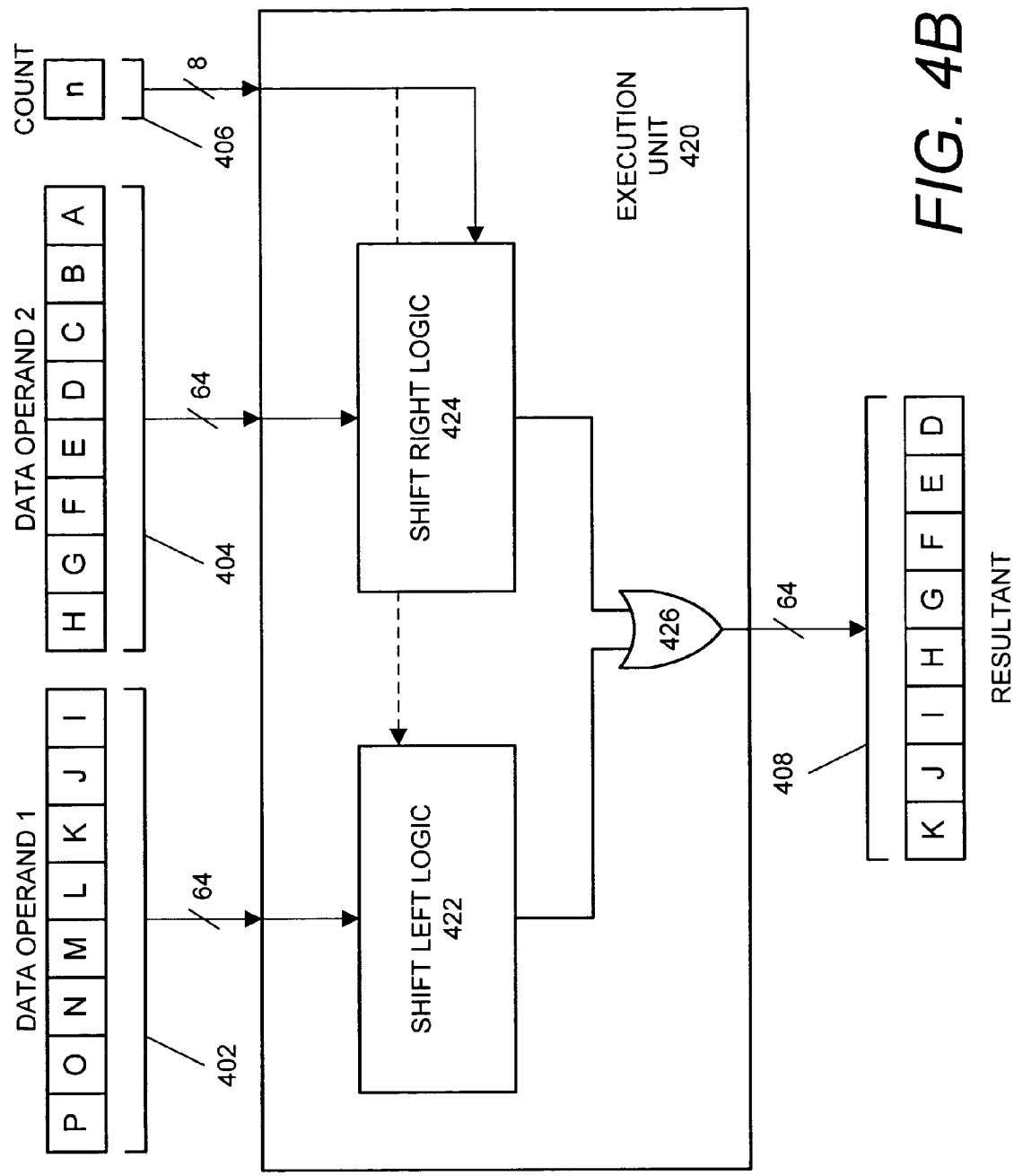
FIG. 4B is a block diagram of another embodiment of logic to perform a shift right merge operation.

FIG. 4B is a block diagram of another embodiment of logic to perform a shift right merge operation. Like the previous example of FIG. 4A, the shift right merge operation of this embodiment begins with three pieces of information: a first 64 bits wide data operand 402, a second 64 bits wide data operand 404, and a 8 bits wide shift count 406. The shift count 406 indicates how many places to shift the data segments. For this embodiment, the count 406 is stated in number of bytes. In an alternate embodiment, the count may indicate the number of bits, nibbles, words, double words, or quad words to shift the data. The first and second operands 402 in this example are each comprised of eight equal length, byte size data segments (H, G, F, E, D, C, B, A) and the second operand 404 is comprised of eight data segments (P, O, N, M, L, K, J, I). The count n is equal to 3. Another embodiment of the invention can operate with alternative length operands and data segments, such as 128/256/512 bits wide operands and bit/byte/word/double word/quad word sized data segments and 8/16/32 bits wide shift counts. Thus embodiments of the present invention are not restricted to particular length data operands, data segments, or shift counts, and can be sized appropriately for each implementation.

The data operands 402, 404, and the count 406 are sent to an execution unit 420 in the processor along with a shift right merge instruction. For this embodiment, the first data operand 402 and the second data operand 404 are received at shift left logic 422 and shift right logic 424, respectively. The count 406 is also sent to the shift logic 422, 424. The shift left logic 422 shifts data segments for the first operand 402 left by the "number of data segments in the first operand—n" number of segments. As the data segments are shifted left, 0's are shifted in from the right side to fill up the vacated spaces. In this case, there are eight data segments, so the first operand 402 is shifted left by eight minus three, or five, places. The first operand 402 is shifted by this different value to achieve the correct data alignment for merging at the logical OR gate 426. After the left shift here, the first data operand becomes: K, J, I, 0, 0, 0, 0, 0. If the count 406 is greater than the number of number of data segments in the operand, the shift left calculation can yield a negative number, indicating a negative left shift. A logical left shift with a negative count is interpreted as a shift in the negative direction and is essentially a logical right shift. A negative left shift will bring in 0's from the left side of the first operand 402.

Similarly, the shift right logic 424 shifts data segments for the second operand right by n number of segments. As the data segments are shifted right, 0's are shifted in from the left side to fill up the vacated spaces. The second data operand becomes: 0, 0, 0, H, G, F, E, D. The shifted operands are outputted from the shift left/right logic 422, 424, and merged together at the logical OR gate 426. The OR gate performs a logical or-ing of the data segments and provides a 64 bits wide resultant 408 of this embodiment. The or-ing together of "K, J, I, 0, 0, 0, 0, 0" with "0, 0, 0, H, G, F, E, D" generates a resultant 408 comprising eight bytes: K, J, I, H, G, F, E, D. This result is the same as that for the first embodiment of the present invention in FIG. 4A. Note that for a count n 406 greater than the number of data elements in an operand, the appropriate number of 0's can appear in the resultant starting on the left side. Furthermore, if the count 406 is greater than or equal to the total number of data elements in both operands, the resultant will comprise of all 0's.

FIG. 5A illustrates the operation of a parallel shift merge instruction in accordance with a first embodiment of the present invention. For these discussions, MM1 504, MM2 506, TEMP 532, and DEST 542, are generally referred to as operands or data blocks, but are not restricted as such and also include registers, register files, and memory locations. In one embodiment MM1 504 and MM2 506 are 64 bits wide MMX registers (also referred to as 'mm' in some instances). At the state I 500, a shift count imm[y] 502, a first operand MM1 [x] 504, and a second operand MM2[x] 506 are sent with the parallel shift right merge instruction. The count 502 is an immediate value of y bits width. The first 504 and second 506 operands are data blocks including x data segments and having total widths of 8× bits each if each data segment is a byte (8 bits). The first 504 and second 506 operands are each packed with a number of smaller data segments. For this example, the first data operand MM1 504 is comprised of eight equal length data segments: P 511, O 512, N 513, M 514, L 515, K 516, J 517, I 518. Similarly, the second data operand MM2 506 is comprised of eight equal length data segments: H 521, G 522, F 523, E 524, D 1225, C 526, B 527, A 528. Thus each of these data segments are 'x * 8' bits wide. So if x is 8, each operand is 8 bytes or 64 bits wide. For other embodiments, a data element can be a nibble (4 bits), word (16 bits), double word (32 bits), quad word (64 bits), etc. In alternate embodiments, x can be 16, 32, 64, etc. data elements wide. The county is equal to 8 for this embodiment and the immediate can be represented as a byte. For alternate embodiments, y can be 4, 16, 32, etc. bits wide. Furthermore, the count 502 is not limited to an immediate value and can also be stored in a register or memory location.

The operands MM1 504 and MM2 506 are merged together at state II 530 to form a temporary data block TEMP[2x] 532 of 2x data elements (or bytes in this case) wide. The merged data 532 of this example is comprised of sixteen data segments arranged as: P, O, N, M, L, K, J, I, H, G, F, E, D, C, B, and A. An eight byte wide window 534 frames eight data segments of the temporary data block 532, starting from the rightmost edge. Thus the right edge of the window 534 would line up with the right edge of the data block 532 such that the window 534 frames data segments: H, G, F, E, D, C, B, and A. The shift count n 502 indicates the desired amount to right shift the merged data. The count value can be implemented to state the shift amount in terms of bits, nibbles, bytes, words, double words, quad words, etc., or particular number of data segments. Based on the count value 502, the data block 532 is shifted right 536 by n data segments here. For this example, n is equal to 3 and the data block 532 is slid three places to the right. Another way of looking at this is to shift the window 534 in the opposite direction. In other words, the window 534 can be conceptually viewed as shifting three places to the left from the right edge of the temporary data block 532. For one embodiment, if the shift count n is greater than the total number of data segments, 2x, present in the combined data block, the resultant would comprise of all '0's. Similarly, if the shift count n is greater than or equal to the number data segments, x, in an the first operand 504, the resultant would include one or more '0's starting from the left side of the resultant. At state III 540, the data segments (K, J, I, H, G, F, E, D) framed by the window 534 is outputted as a resultant to an x data elements wide destination DEST[x] 542.

Figure 5B:
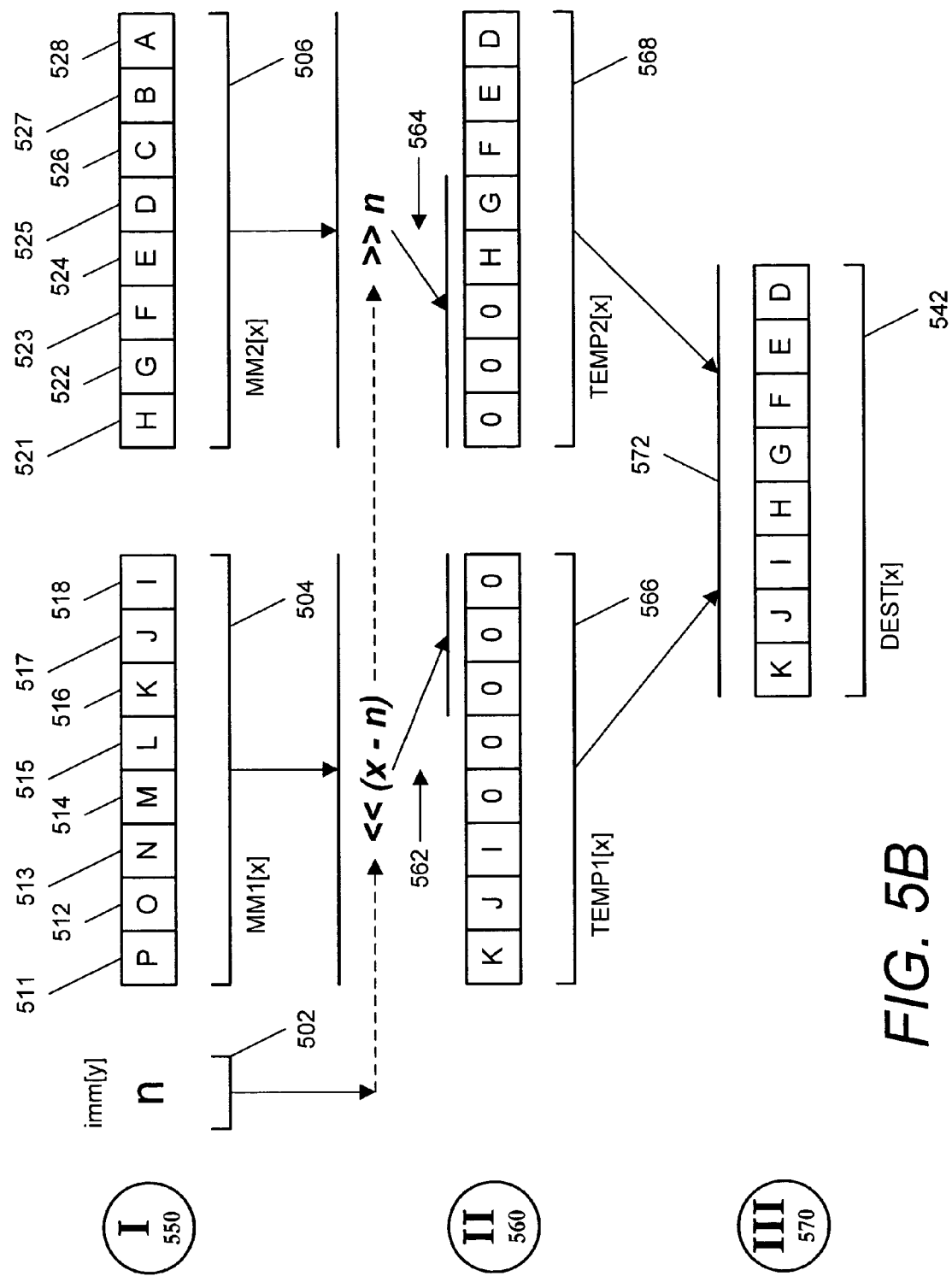
FIG. 5B illustrates the operation of a shift right merge instruction in accordance with a second embodiment.

FIG. 5B illustrates the operation of a shift right merge instruction in accordance with a second embodiment. The shift right merge instruction is accompanied at state I 550 by a count imm[y] of y bits, a first data operand MM1[x] of x data segments, and as second data operand MM2[x] of x data segments. As with the example of the FIG. 5A, y is equal to 8 and x is equal to 8, wherein MM1 and MM2 each being 64 bits or 8 bytes wide. The first 504 and second 506 of this embodiment are packed with a number of equally sized data segments, each a byte wide in this case, "P 511, O 512, N 513, M 514, L 515, K 516, J 517, I 518" and "H 521, G 522, F 523, E 524, D 525, C 526, B 1227, A 528", respectively.

At state II 560, the shift count n 502 is used to shift the first 504 and second 506 operands. The count of this embodiment indicates the number of data segments to right shift the merged data. For this embodiment, the shifting occurs before the merging of the first 504 and second 506 operands. As a result, the first operand 504 is shifted differently. In this example, the first operand 504 is shifted left by x minus n data segments. The "x−n" calculation allows for proper data alignment at later data merging. Thus for a count n of 3, the first operand 504 is shifted to the left by five data segments or five bytes. There are 0's shifted in from the right side to fill the vacated spaces. But if shift count n 502 is greater than the number of number of data segments x available in first operand 504, the shift left calculation of "x−n" can yield a negative number, which in essence indicates a negative left shift. In one embodiment, a logical left shift with a negative count is interpreted as a left shift in the negative direction and is essentially a logical right shift. A negative left shift will bring in 0's from the left side of the first operand 504. Similarly, the second operand 506 is shifted right by the shift count of 3 and 0's are shifted in from the left side to fill the vacancies. The shifted results are held for the first 504 and second 506 operands are stored in x data segments wide registers TEMP1 566 and TEMP2 568, respectively. The shifted results from TEMP1 566 and TEMP2 568 are merged together 572 to generate the desired shift merged data at register DEST 542 at state III 570. If shift count n 502 is greater than x, the operand can contain one or more 0's in the resultant from the left side. Furthermore, if shift count n 502 is equal to 2x or greater, the resultant in DEST 542 will comprise of all 0's.

In the above examples, such as in FIGS. 5A and 5B, one or both MM1 and MM2 can be 64 bits data registers in a processor enabled with MMX/SSE technology or 128 bits data registers with SSE2 technology. Depending on the implementation, these registers can be 64/128/256 bits wide. Similarly, one or both of MM1 and MM2 can be memory locations other than a register. In the processor architecture of one embodiment, MM1 and MM2 are source operands to a shift right merge instruction (PALIGNR or PSRMRG) as described above. The shift count IMM is also an immediate to such a PALIGNR instruction. For one embodiment, the destination for the resultant, DEST, is also a MMX or XMM data register. Furthermore, DEST may be the same register as one of the source operands. For instance, in one architecture, a PALIGNR/PSRMRG instruction has a first source operand MM1 and a second source operand MM2. The predefined destination for the resultant can be the register for the first source operand, MM1 in this case.

Figure 6A:
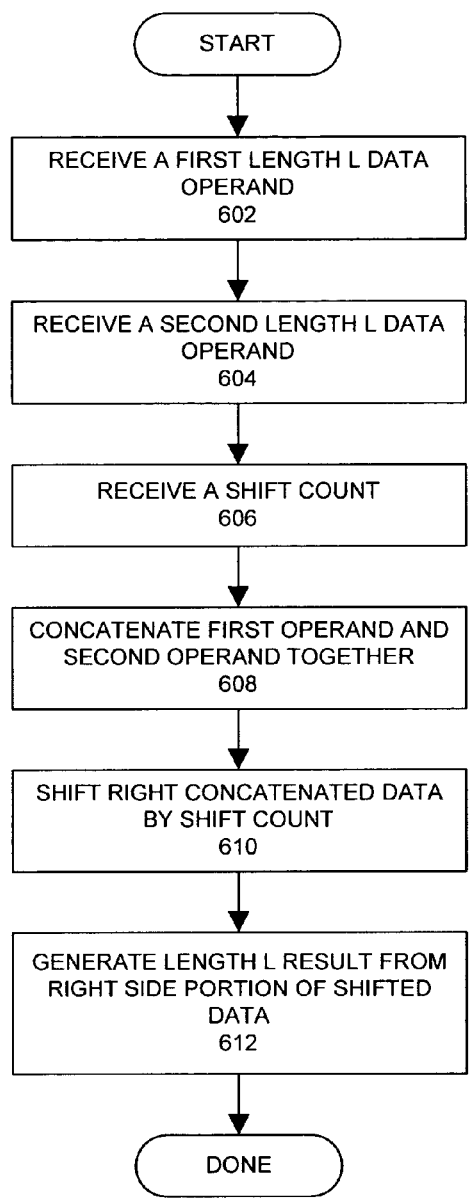
FIG. 6A is a flowchart illustrating one embodiment of a method to shift and merge data operands.

FIG. 6A is a flowchart illustrating one embodiment of a method to shift and merge data operands. The length values of L is generally used here to represent the width of the operands and data blocks. Depending on the particular embodiment, L can be used to designate the width in terms of number of data segments, bits, bytes, words, etc. At block 602, a first length L data operand is received for use with the execution of a shift merge operation. A second length L data operand for the shift merge operation is also received at block 604. A shift count to indicated how many data segments or distance, in bits/nibbles/bytes/words/double words/quad words, is received at block 606. Execution logic at block 608 concatenates the first operand and the second operand together. For one embodiment, a temporary length 2L register holds the concatenated data block. In an alternated embodiment, the merged data is held in a memory location. At block 610, the concatenated data block is shifted right by the shift count. If the count is expressed as a data segment count, then the data block is shifted right by that many data segments and 0's are shifted in from the left along the most significant end of the data block to fill the vacancies. If the count is expressed in bits or bytes, for example, the data block is similarly right shifted by that distance. At block 612, a length L resultant is generated from the right hand side or least significant end of the shifted data block. For one embodiment, the length L amount of data segments are muxed from the shifted data block to a destination register or memory location.

Figure 6B:
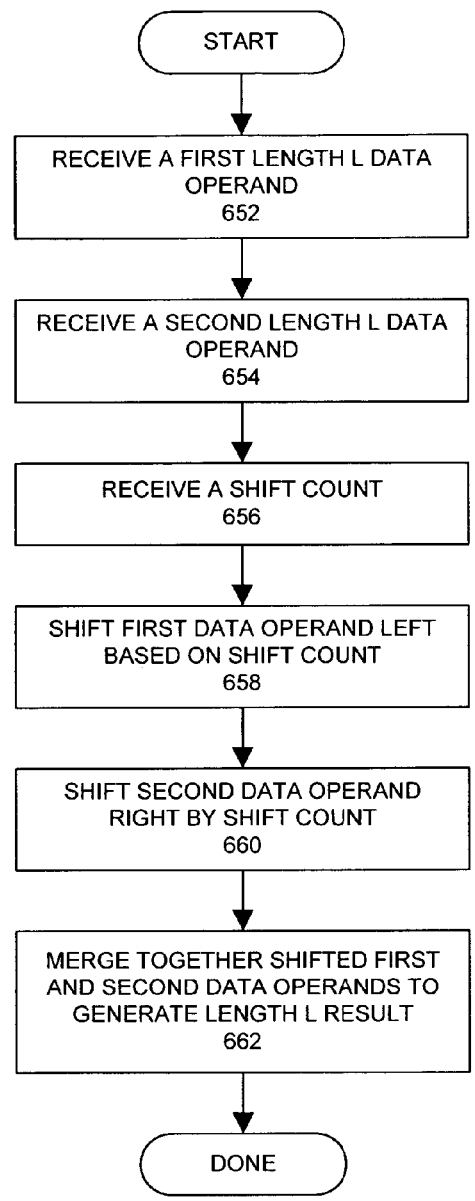
FIG. 6B is a flowchart illustrating another embodiment of a method to shift right and merge data.

FIG. 6B is a flowchart illustrating another embodiment of a method to shift right and merge data. A first length L data operand is received for processing with a shift right and merge operation at block 652. A second length L data operand is received at block 654. At block 656, a shift count to indicate the desired right shift distance. The first data operand is shifted left at block 658 based on a calculation with the shift count. The calculation of one embodiment comprises subtracting the shift count from L. For instance, if operand length L and shift count are in terms of data segments, then the first operand is shifted left by "L—shift count" segments, with 0's shifting in from the least significant end of the operand. Similarly, if L is expressed in bits and the count is in bytes, the first operand would be shifted left by "L—shift count * 8" bits. The second data operand is shifted right at block 660 by the shift count and 0's shifted in from the most significant end of the second operand to fill vacancies. At block 662, the shifted first operand and the shifted second operand are merged together to generate a length L resultant. For one embodiment, the merging yields a result comprising the desired data segments from both the first and second operands.

One increasingly popular use for computers involves manipulation of extremely large video and audio files. Even though these video and audio are typically transferred via very high bandwidth networks or high capacity storage media, data compression is still necessary in order to handle the traffic. As a result, different compression algorithms are becoming important parts of the representation or coding scheme for many popular audio, image, and video formats. Video in accordance with one of the Motion Picture Expert Group (MPEG) standards is one application that uses compression. MPEG video is broken up into a hierarchy of layers to help with error handling, random searching and editing, and synchronization.

Figure 7A:
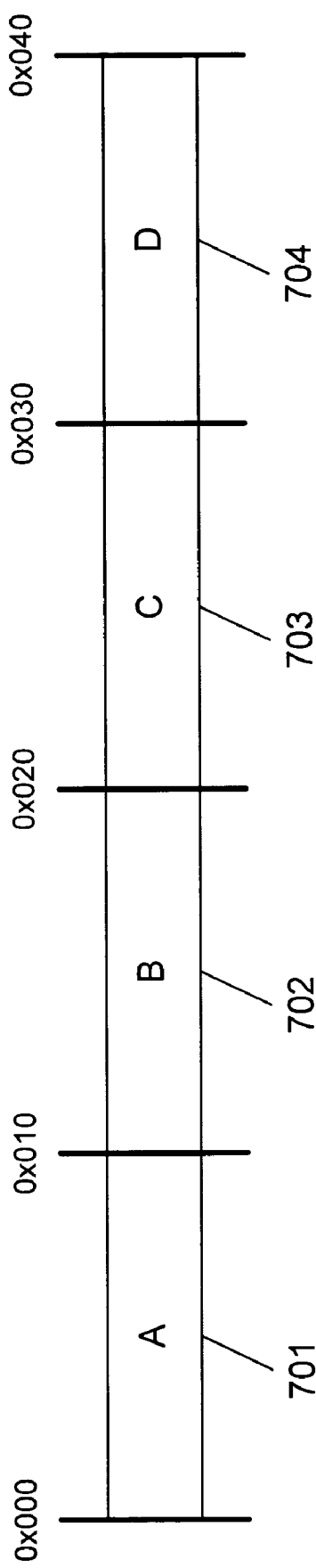
FIG. 7A illustrates an example memory region.

Embodiments of the present invention provide a way to implement an algorithm to perform misaligned memory copy/move operations with aligned memory operations through the use of SIMD instructions and related hardware. One embodiment of the present invention is described in the context of memory load and memory copy operations. FIG. 7A illustrates an example memory region. This memory region ranges from hex address 0×000 to 0×040 and includes five address boundaries: ×000, 0×010, 0×020, 0×030, and 0×040. For this embodiment, sixteen byte sized data elements can be stored between each boundary, one individual byte of data at each individual address location. For example, data block A 701 ranging from address 0×000 to 0×010 can store sixteen bytes. In this illustration, data blocks A 701, B 702, C 703, and D 704 are aligned at memory address 0×000, 0×010, 0×020, and 0×030, respectively. Although the examples described herein are in the context of sixteen byte long data blocks, embodiments of the present invention are not restricted as such. In other embodiments, the data blocks and elements can be of various lengths and sizes.

In one embodiment, multimedia data for an audio and/or video is communicated along a data bitstream. Depending on the particular implementation, bitstream can be a live stream of data or a stream of data presently located within memory. The portion of bitstream in one example includes data blocks A 701, B 702, C 703, and D 704. Although a limited number of data blocks are shown for the bitstream, the bitstream can be considered as having a plurality of additional other data blocks or treated as a long stream of data being fed from a source. The data blocks here can be of any predetermined size. For one embodiment, each data block is sixteen bytes or two doublewords wide.

In some embodiments, the merge operation is performed at a byte granularity along byte boundaries. The varying data lengths can cause boundaries to exist at inconvenient places. Whereas byte boundaries can be easily handled, data not boundary aligned may not be as easily handled without a shift merge type of operation to synchronize and merge broken up data segments. Depending on the particular embodiment, additional features can be implemented to further enhance performance. For instance, the merge instruction and the merge operation as described in the examples above can also be implemented with different degrees of granularity. In alternative embodiments of a merge instruction, the merge algorithm can operate with data blocks having lengths including, but not limited to, doublewords, quadwords, and even bits. Similarly, a merge instruction can be tuned to operate specifically with four or six byte operands at predetermined memory address boundaries to minimize the address calculations for memory loads during the data merge.

Figure 7B:
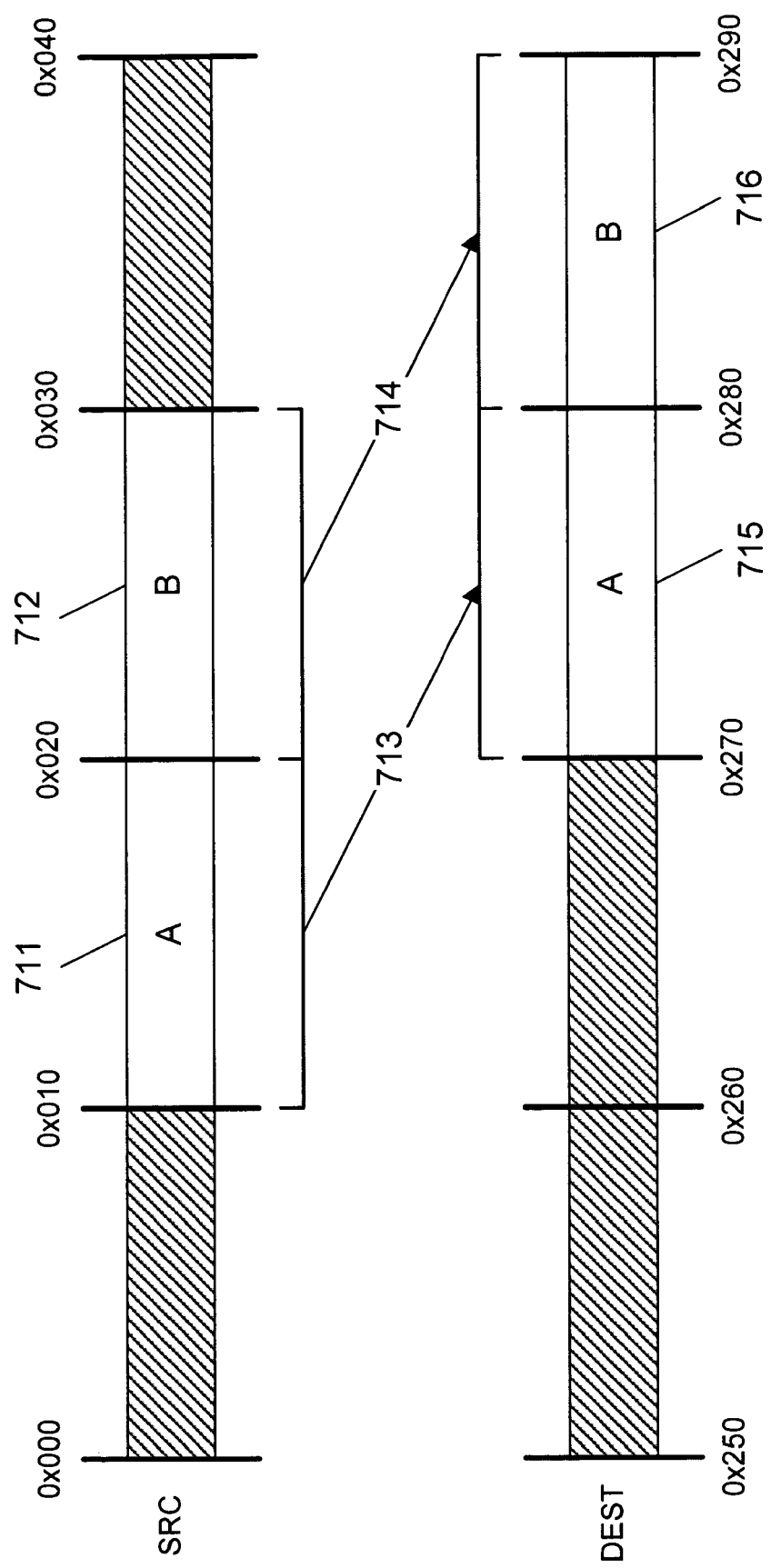
FIG. 7B illustrates a memory copy from an aligned source address to an aligned destination address.

FIG. 7B illustrates a memory copy from an aligned source address to an aligned destination address. The source data comprising data blocks A 711 and B 712 are located between memory addresses x010 and 0×030. A 711 and B 712 are both aligned at an address boundary. The destination region for the source data is between memory addresses 0×270 and 0×290. For this example, sixteen byte aligned load and aligned stores instructions are used to perform the memory copy. Instructions for aligned memory copies from address 0×010 to 0×270 and from 0×020 to 0×280 are processed. A sixteen byte aligned copy operation 713 loads A 711 from 0×010 and stores the data as A 715 at 0×270. Similarly, another sixteen byte aligned copy operation 714 loads B 712 from 0×020 and stores that data as B 716 at 0×280. In this type of situation, if any additional end bytes located after B 712 at 0×030 are to be copied, other types of memory load/store operations can be performed depending on whether those end bytes are aligned or not. A misaligned access requires twice the number of memory operations as an aligned access.

Figure 7C:
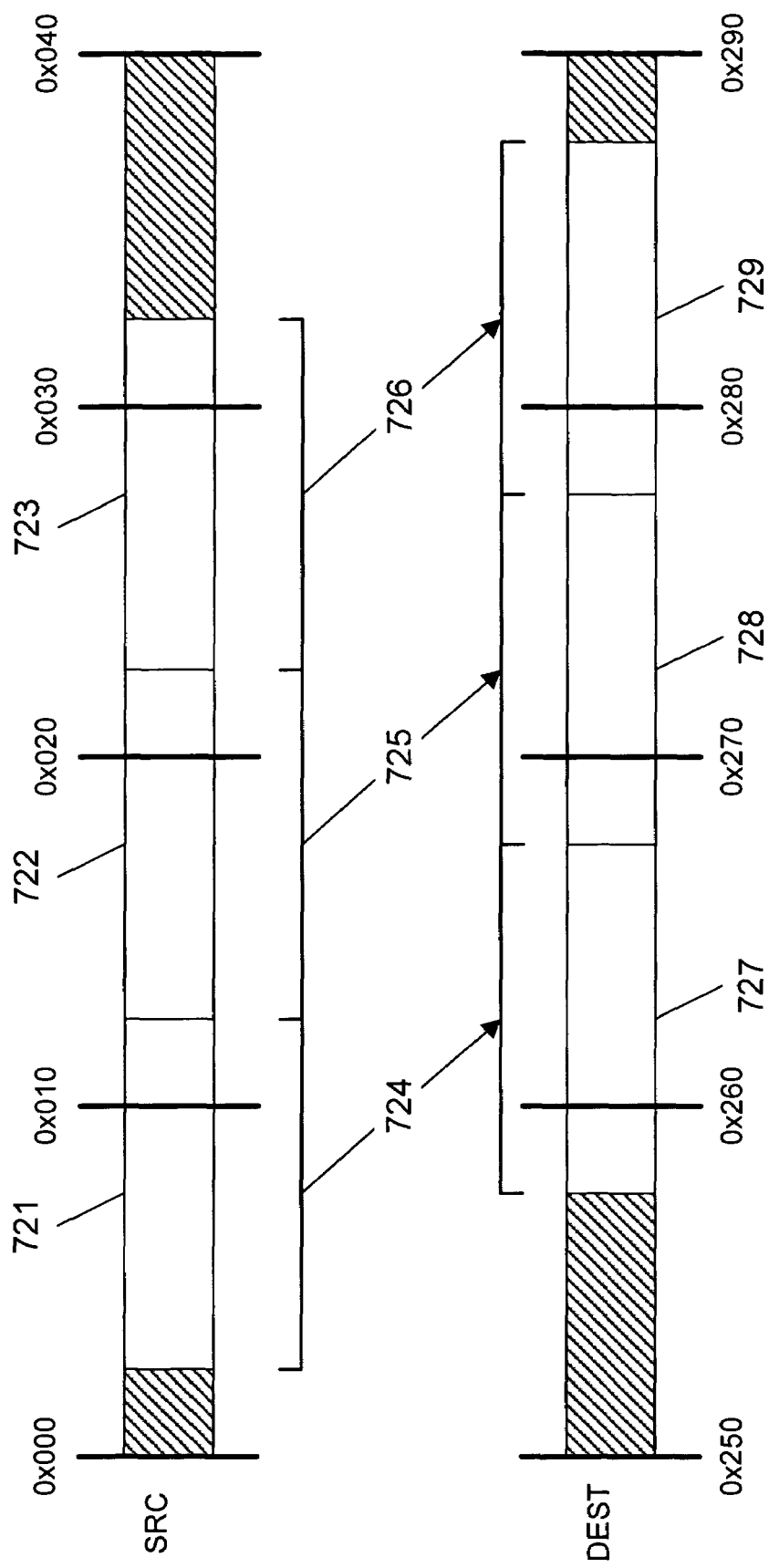
FIG. 7C illustrates a memory copy from a misaligned source address to a misaligned destination address using unaligned memory accesses.

FIG. 7C illustrates a memory copy from a misaligned source address to a misaligned destination address using unaligned memory accesses. The source data here is comprised of data block 721, 722, 723. However, the data blocks are not aligned at address boundaries and are located somewhere between 0×000 and 0×040. The destination region for the source data is between 0×250 and 0×290, starting at an unaligned address between 0×250 and 0×260. Memory copies from involving both misaligned source and destination are more problematic as misaligned accesses require twice the number of load and store operations as an aligned access. Furthermore, additional performance penalties can be incurred if any of the loads cross cache lines. For example, a copy 724 uses a misaligned load operation to load data 721 and a misaligned store operation to store that data 727 at the destination. Similar copies 725 and 726 are needed for data 722 and 723.

Figure 7D:
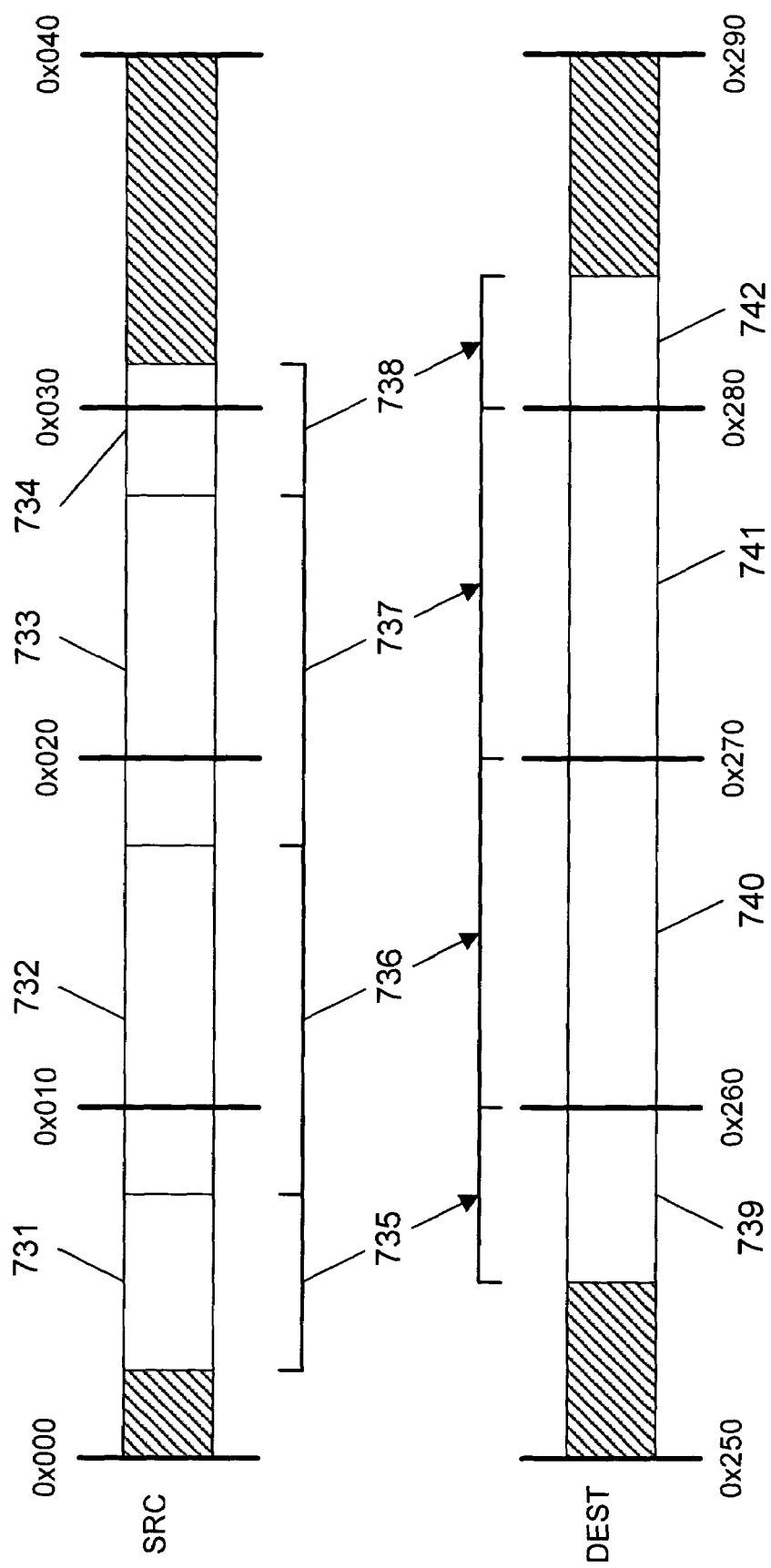
FIG. 7D illustrates a memory copy from a misaligned source to a misaligned destination using unaligned load/aligned store operations.

One method of improving performance is to reduce or eliminate the need for unaligned memory accesses. FIG. 7D illustrates a memory copy from a misaligned source to a misaligned destination using unaligned load/aligned store operations. Source data 731, 732, 733, 734 are located at addresses within a memory region between 0×000 and 0×040. The source data can be separate into various chunks for handling. In this example, the span of between two address boundaries is sixteen bytes. For this embodiment, the source data is broken up into four segments based on the layout of the destination space. The method of this embodiment attempts to form boundary aligned data blocks with the source data so that aligned accesses can be performed at the destination. However, edge cases can exist at the beginning and end of the source data depending on factors including, but not limited to, the starting destination address, source data length, alignment boundaries, and ending destination address. By considering the edge cases separately, some aligned stores can be used with the destination space.

The first data block 731 is sized to fit the available memory space 739 between the starting destination address and the first boundary. If the starting destination address was a boundary, 0×250 for instance, then the first data block would be sized for aligned memory accesses. Data blocks 732 and 733 are each sized with enough data segments to be boundary aligned at the destination. The last data block 734 is sized with the remaining data segments to fit the space 742 after the 0×280 boundary. If there is enough data for the last data block to fill the memory space between 0×280 and 0×290, then an aligned memory access could be performed. Data blocks 731 and 734 here are each less than sixteen bytes in length. Data blocks 732 and 733 are each sixteen bytes long.

Memory copy or move operations transport the data from the source address to the destination address. In this case, an unaligned memory access copies 735 the first data block 731 to the first destination space 739. An unaligned memory access loads the sixteen byte long data block 732l and uses an aligned memory store operation 736 to write that data to the aligned space starting at boundary 0×260. Similarly, an unaligned memory access loads the next sixteen byte long source data block 733 and writes the data with an aligned memory store to aligned boundary 0×270. The last portion 734 of the source data is accessed with an unaligned load operation and written with an unaligned store 738 at destination space 742 as the last block 734 is less than the sixteen bytes length for an aligned memory operation.

The example above allowed for aligned data at the destination while unaligned accesses were done at the source. Conversely, the source region can also be aligned, in which case aligned accesses can be implemented at the source and unaligned accesses at the destination. Depending on the memory space and boundaries, an embodiment of the present invention can potentially save clock cycles on cacheline splits. Although a number of aligned memory operations were implemented in lieu of unaligned operations to improve the performance of this memory copy over that in the example of FIG. 7C, the use of boundary aligned memory accesses can be further increased.

Figure 7E:
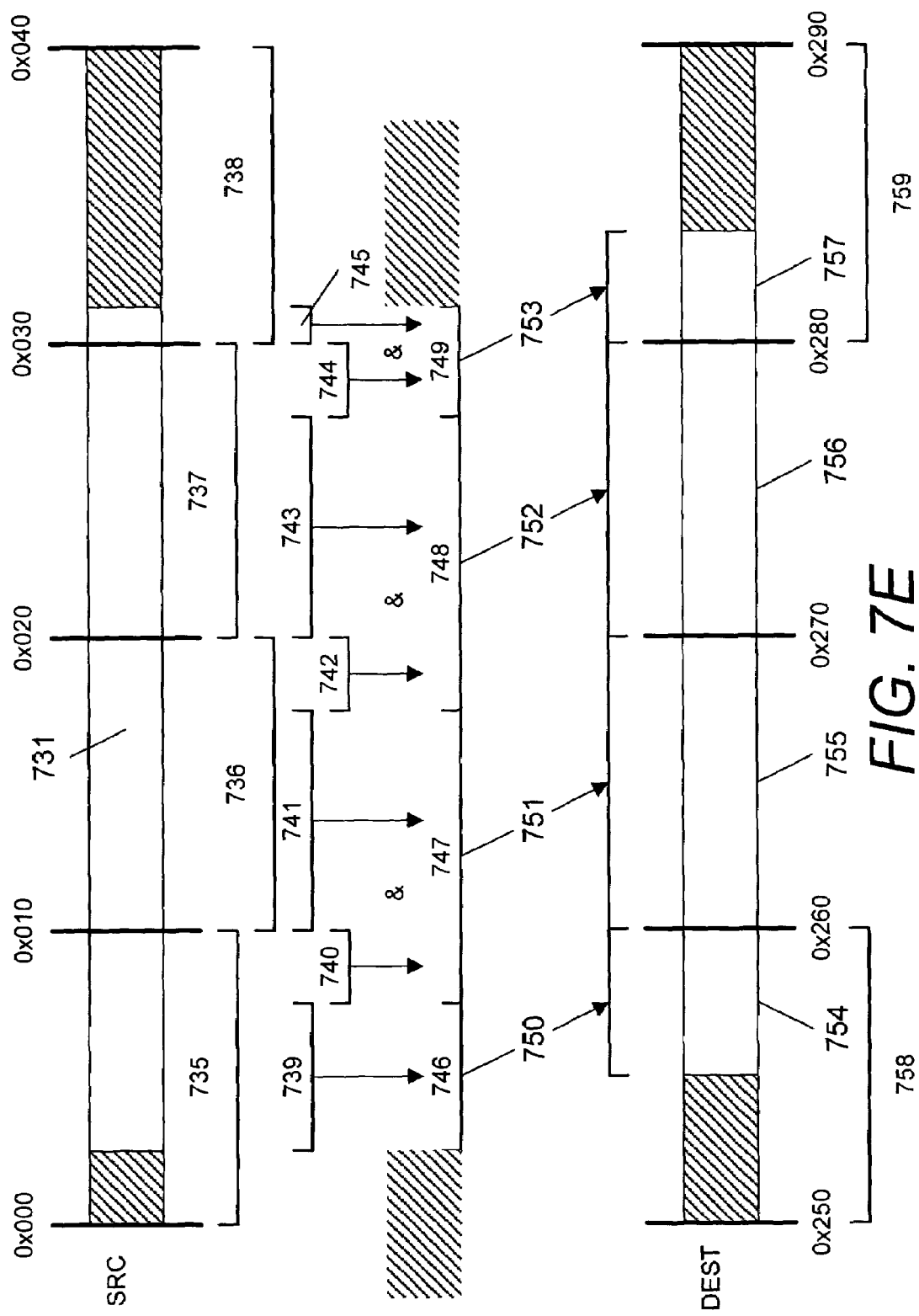
FIG. 7E illustrates a memory copy to and from unaligned memory addresses using aligned load and store operations in accordance to one embodiment of the present invention.

FIG. 7E illustrates a memory copy to and from unaligned memory addresses using aligned load and store operations in accordance to one embodiment of the present invention. Source data 731 is located at memory address space between 0×000 and 0×040. In this embodiment, the memory boundaries are located at sixteen byte blocks. Here, boundaries exist at 0×000, 0×010, 0×020, 0×030, and 0×040. For this example, the source data 731 is to be copied from the region between 0×000 and 0×040 to a destination memory space between 0×250 and 0×290. This embodiment employs the use of boundary aligned loads to access the source data and boundary aligned stores to write the data at the destination. The source data 731 is handled as a plurality of data blocks. By using primarily aligned memory accesses along memory boundaries, cacheline split issues are also reduced or avoided. The memory copy including constant merge code of one embodiment can achieve dramatic improvements over a misaligned copy. Above a certain byte threshold on the number of copy bytes, the memory copy with merge can approach the performance levels of a comparable aligned copy.

This example embodiment generally describes the merge shift counts or offsets. In one implementation the shift count can be predetermined at code compilation or hard coded and provided as an immediate value, as in the copying from a data library or fixed sequence. For one embodiment with a fixed offsets, sixteen different loops may be needed, every loop with a different immediate merge for the sixteen possible misalignments along a sixteen byte block. In another implementation, the shift count can be variable and determined at runtime. For instance, the algorithm of one embodiment can dynamically determine the offset needed to correctly merge source data from different blocks for storing at a destination address. The code for the variable merge approach can be less complex and more flexible in its use as the source data and destination space can be misaligned along a large variety of possible byte addresses.

An embodiment having a variable merge approach that allows for the computation of the source offset value can be implanted in a single loop. For instance, the duplication of filtering code for all possible alignments as in a constant offset embodiment may be undesirable due to code footprint, maintainability, and implementation considerations. A variable merge technique can overcome these issues by enabling a single block of code to function with multiple alignments. In one embodiment, a variable merge approach can eliminate the performance difference between an aligned memory copy and a misaligned one. The variable merge instruction can also help reduce the code size of filter algorithms and copy kernels.

Edge cases also exist in this example as illustrated by the less the full sixteen bytes in the beginning (0x000-0x010) and end (0x030-0x040) regions. There are multiple ways of dealing with the edge cases. The first data block 735 including both data to be copied and unrelated data, shown with cross hatch marks, is loaded with an aligned load. As indicated above in the example of FIG. 7D, the algorithm of one embodiment can determine the amount of available space before a boundary in the first destination space. In this case, that available space is indicated as 754 between destination addresses 0x250 and 0x260. The appropriate number of bytes can be extracted from the first source data block 735 to fill the first available destination space 754. The goal for this first memory operation is to copy 750 source data 739 to space 754. Although an unaligned memory store can be performed to write the data at space 754, the use of a more efficient aligned memory store is possible. The data block 758 bounded by destination addresses 0x250 and 0x260 is loaded with an aligned load.

A left shift is performed on the first data block 735 to shifted out the unrelated (cross hatched) data and align the source data to the left edge. The left edge of the left shifted block now begins with the left edge of source data 739. A right shift is performed on data block 758 to shift out the old data at space 754 and align the unrelated data of block 758 with the right edge. The right edge of this right shifted block now begins with the right edge of the cross hatched section of data block 758. A merge operation is performed on the left shifted first data block 735 and the right shifted destination data block 758. The shift count for this merge operation is dependent on the available space 754. For example, if free space 754 is eight data segments or bytes in length, a shift count of eight will enable eight bytes 746 worth of source data 739 to be merged with the existing unrelated adjacent neighbor data, as shown by the cross hatches at 0x250, before the starting destination address. In other words, a merge operation of the right shifted destination data block 758 with the left shifted first data block 735 will yield a merged block wherein an appropriate amount of source data 739 together with preexisting adjacent destination data can be stored with an aligned memory store operation at 0x250.

Figure 7F:
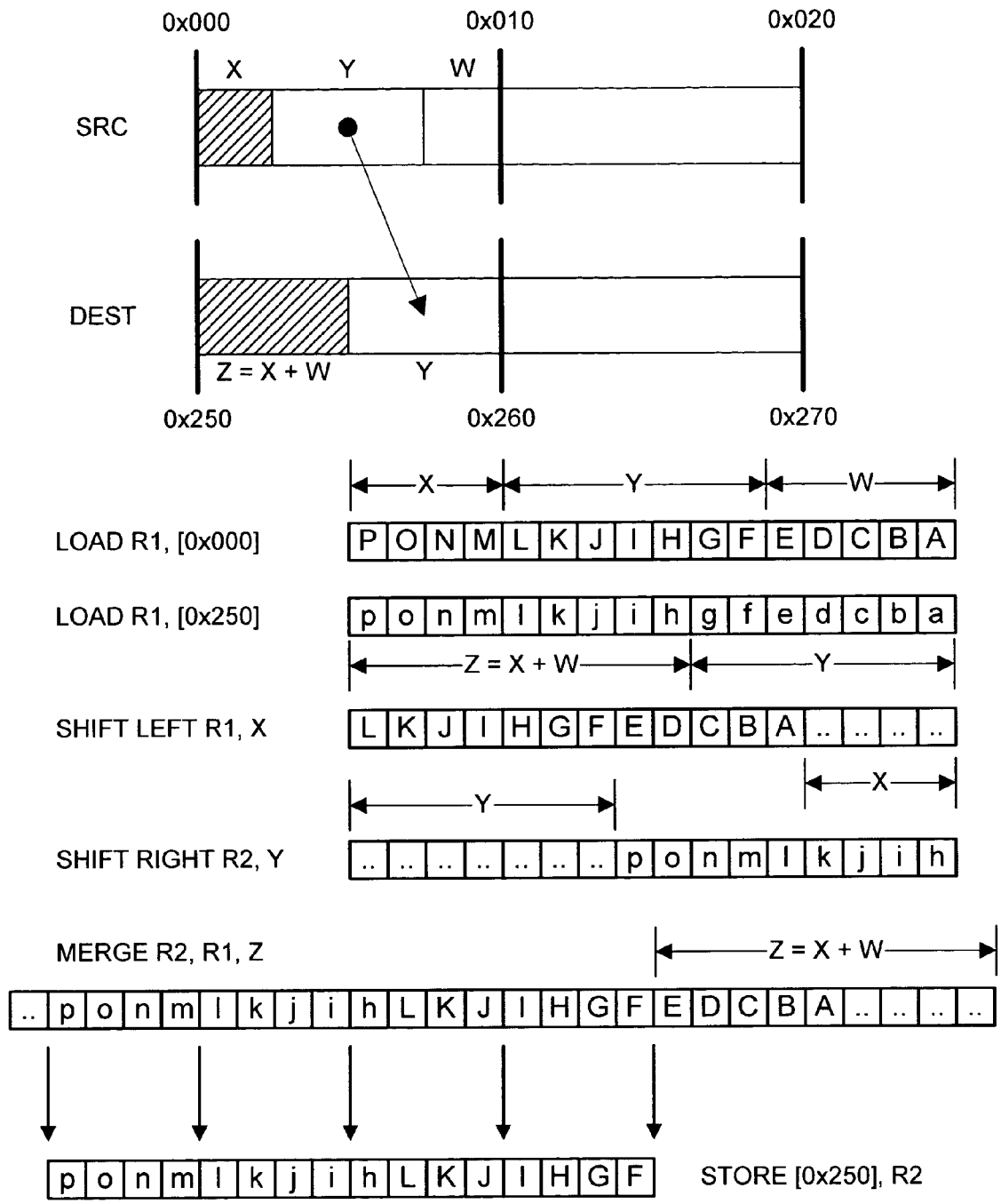
FIG. 7F illustrates the handling of a front end boundary condition for one embodiment of the memory copy algorithm of FIG. 7E in greater detail.

FIG. 7F illustrates the handling of a front end boundary condition for one embodiment of this example memory copy algorithm in greater detail. The pseudo code for handling the front end boundary of the source data 731 in this example embodiment can be illustrated as:

| | |
|---|---|
| LOAD REG1, [0x000] | Loading first data block 735 to register REG1. |
| LOAD REG2, [0x250] | Loading data block 758 to register REG2. |
| SHIFT LEFT REG1, X | Left shifting first data block 735 by distance X to align the source data 739 with the left edge. |
| SHIFT RIGHT REG2, Y | Right shifting data block 758 by distance Y to align the cross hatched data at data block 758 with the right edge. |
| PALIGNR REG2, REG1, Z | Merge together the shifted data by a shift count Z to obtain a desired merged block. |
| STORE [0x250], REG2 | Store the merged data block with an aligned store at 0x250. |

The algorithm of this embodiment allows one or more subsequent memory stores to be aligned accesses. For example, the first memory copy filled up the free destination space 754 up to the memory boundary at 0x260. Provided that source data 731 has at least data, sixteen bytes in this example, to fill the space between boundary addresses 0x260 and 0x270, an aligned memory operation can be performed. The second source data block 736 from between source addresses 0x010 to 0x020 is loaded with an aligned load. Note that in this example, the destination space 754 was not able to take up all the source data from the first source data segment 735. As a result, the "left over" or remaining portion of the source data between 0x000 and 0x010 still needs to be written. That left over data will have an influence on the subsequent adjacent source data. For this embodiment, the first block data 735 that was previously loaded above was kept and can now be reused without having to perform another load of that same data.

By having the option to reuse the data, an additional memory load can be avoided, thus further improving performance. A merge operation is performed with the first source block 735 and the second source block 736 to create a merged data block 747 that includes remaining data 740 from block 735 and enough data 741 from block 736 to meet the sixteen byte length between boundaries. The merge offset here is calculated as the difference between sixteen and the number of remaining source bytes 740 not yet copied from block 735. This calculation should yield the length of data 741. The merged block 747 is written with an aligned memory store operation 751 to destination space 755 at 0x260.

Note that in the case where the first piece of source data 739 was equal to the first destination space 754, one or more of the merge operations may not be needed as the subsequent pieces of source data would already be aligned at boundaries. For instance, if the end address of data 739 was 0x010, then piece 740 would not be needed and the entire sixteen bytes of data block 736 could be copied as one block. In this example, the next data block 737 is also accessed with an aligned load. A merge operation is performed on the second 736 and third 737 data blocks with a shift count equal to sixteen minus the length of data 742. The remaining data 742 from block 736 is merged with enough data 743 from block 737 to form a sixteen byte long data block 748. The merged data block 748 is written to destination space 756 at starting address 0x270 with an aligned memory operation.

Exemplary pseudo code for handling the middle portions between the boundaries of the source data 731 in this embodiment can be illustrated as:

| | |
|---|---|
| LOAD REG1, [0x010] | Loading data block 736 to register REG1. |
| LOAD REG2, [0x020] | Loading data block 737 to register REG2. |
| PALIGNR REG2, REG1, Z | Merge together the source data by a shift count Z to obtain a desired merged block. |
| STORE [0x270], REG2 | Store the merged data block with an aligned store at 0x270. |

For this embodiment, the process of performing aligned memory loads of source data, merging of source data to create merged data blocks, and aligned memory stores of merged data blocks can continue until the end of the source data for this memory copy is reached. The overall performance improvement in one embodiment is dependent on the amount of data being processed during that transaction. For example, the greater the amount of data for copying, the better opportunity to use merge operations with aligned memory accesses instead of unaligned accesses.

As indicated above with the edge condition at the starting edge of the source data, a similar type of edge condition can exist at the ending edge. In this example, the last data block 738 includes a small piece of data less than the width between boundaries, sixteen bytes in this case. Like above, an aligned memory load is made for data block 738. A merge operation between data blocks 737 and 738 with a shift count equal to the difference between sixteen and the length of data 744 is performed. Thus the remaining data 744 of block 737 is merged with the available source data 745 in block 738 to form a merged block 749. Because there is insufficient source data 745 in block 738 to form a sixteen byte long block even after the merge operation, some unrelated data after the end of source data 731, as shown with cross hatch marks in block 738, may have also been included in the merge operation. In one instance, an unaligned memory store 753 can be use to write just the source data bytes in block 749 to the destination space 757. However, to use an aligned memory store, this unrelated data has to be removed before storing to destination data block 759. One method is to perform a logical AND operation on block 749 to zero out the unrelated data the extend beyond the destination space 757. An aligned load of destination block 759 is performed and the destination space 757 zeroed out. The two modified block can be logically OR-ed together wherein merged data 759 is OR-ed to fill the zeroed space 757 and the unrelated destination data fills the rest of the sixteen byte block. Then, this final data block can be written with an aligned store to block 759.

Alternatively, block 749 can merged together with the unrelated cross hatched data beyond destination space 757 of destination block 759. For the pseudo code for handling the back end boundary of the source data 731 in one example embodiment can be illustrated as:

| | |
|---|---|
| LOAD REG1, [0x020] | Loading data block 737 to register REG1. |
| LOAD REG2, [0x030] | Loading data block 738 to register REG2. |
| LOAD REG3, [0x280] | Loading data block 759 to register REG3. |
| PALIGNR REG2, REG1, A | Merge together the source data by a shift count A to obtain a merged source block. |
| SHIFT LEFT REG3, B | Left shifting data block 759 by distance B to align the cross hatched data at data block 759 with the left edge. |
| PALIGNR REG2, REG3, C | Merge together the merged source block and the shifted destination block 759 by a shift count C to obtain a desired merged block. |
| STORE [0x280], REG2 | Store the merged data block with an aligned store at 0x280. |

Here, the value of A is based on the amount of remaining source data 745 in block 738. The merge operation of the data block 737 and data block 738 creates a merged source data block 749. The left shift on data block 759 is to shift out the old data at space 757 and align the unrelated data of block 759 shown in cross hatch with the left edge. In this example, the left shift is for a distance B, wherein B is equal to the length of space 757. The left edge of the left shifted block begin with the left edge of the cross hatched section of data block 759. A merge operation on the merged source data 749 with the left shifted block 759 generates a merged data block comprised of the remaining source data 749 and the unrelated data of block 759. The shift count C in this case is based on the amount of remaining source data 749 and the size of destination space 757. The merged data block can be stored with an aligned memory store operation to address 0×280. Thus remaining source data 749 can be arranged to occupy the destination space 757.

Another method is to perform a shuffle type of operation on the merged data block 749 and loaded block 759 data to obtain a data block with data 749 occupying destination space 757 adjacent to the unrelated (cross hatched marked) destination data. This shuffled data can be stored with an aligned memory operation to address 0×280. Thus by including the use of SIMD merge type of operations, aligned memory accesses are enabled for the accomplishment of achieve memory copies. For embodiments of the present invention, the combination of SIMD merge type of operations with aligned memory accesses take fewer clock cycles and have shorter execution latency than the use of unaligned memory accesses. As a result, embodiments of the present invention can reduce the demand on resources and help improve system performance.

Figure 8A:
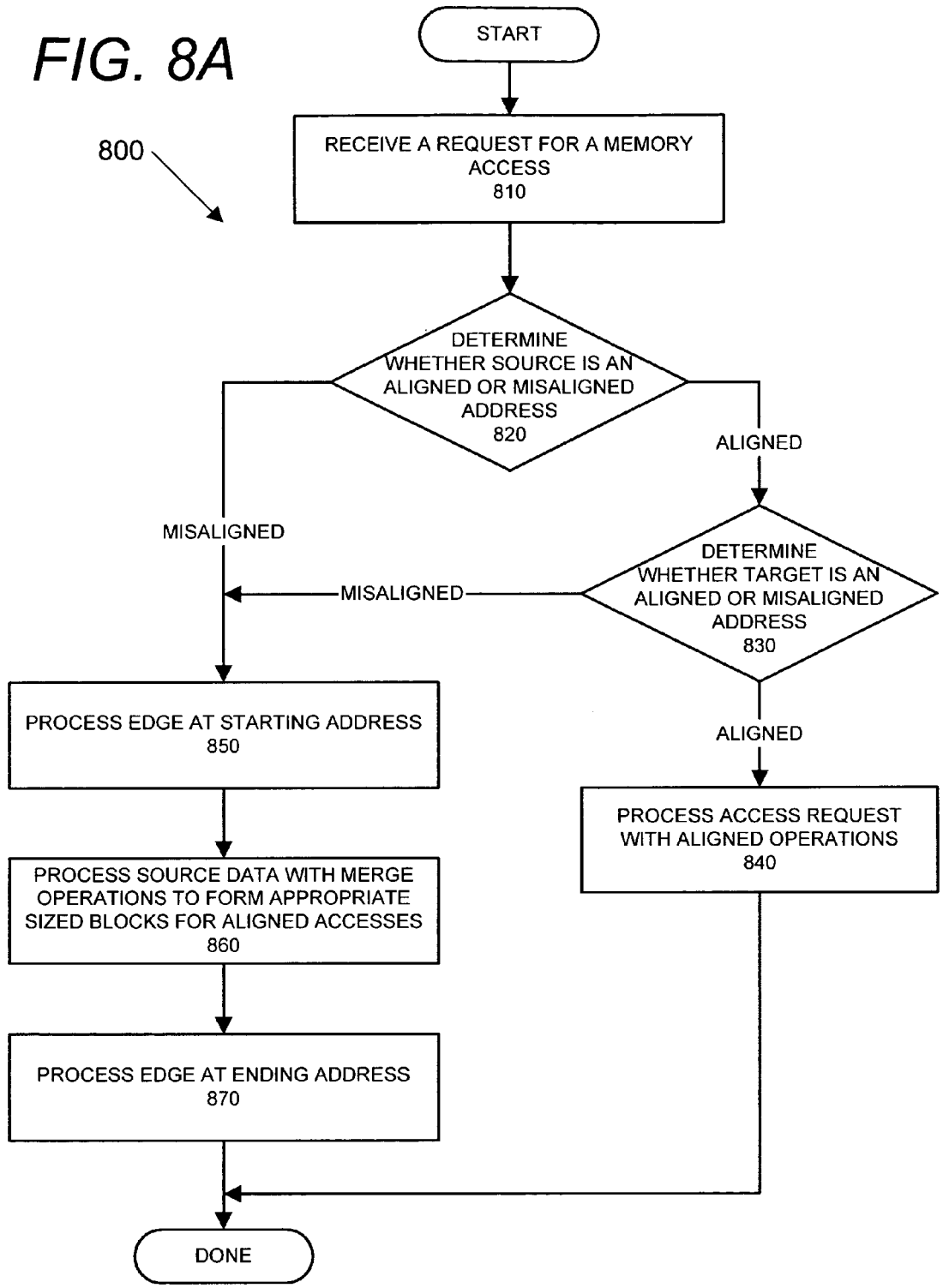
FIGS. 8A-D are flowcharts illustrating one embodiment of a method to accomplish misaligned memory accesses through aligned memory load/copy operations in conjunction with merge operations.

Embodiments of the present invention involve the use of merge operations to optimize and simplify the copying and movement of data to and from memory. By avoiding unaligned loads and using aligned loads instead, pressure on the load ports can be relieved significantly. FIGS. 8A-D are flowcharts illustrating one embodiment of a method to accomplish misaligned memory accesses through aligned memory load/copy operations in conjunction with merge operations. The flowchart 800 at FIG. 8A illustrates the processing of an access request to an unaligned address in accordance with one embodiment of the present invention. At block 810, a memory access request is received. A determination is made as to whether the memory address for the source data is aligned or misaligned at block 820. If the source address is aligned, another determination is made at block 830 as to whether the memory address for the destination space is aligned or misaligned. If the destination address is also found to be aligned, then the memory access for scenario along this particular path involves a memory copy or move from an aligned source address to another aligned destination address. Thus the memory access request is processed with aligned memory operations at block 840.

If either the source address or the destination address is found to be unaligned at decision blocks 820 and 830, respectively, then the memory access is processed in pieces in accordance to one embodiment of the present invention. At block 850, source data from the starting address edge is processed. In one embodiment, this first source data is up to a first aligned memory boundary. The algorithm of this embodiment coordinates the available source data and the available destination memory space up to a first aligned memory boundary at the destination also. As a result, aligned memory operations can be used. Further discussion is provided below with FIG. 8B. Because the source data at the starting edge was processed up to a boundary address, one or more subsequent memory loads of the following source data and memory stores at the destination space can be aligned memory accesses. At block 860, source data is loaded with aligned loads and processed with merge operations to form appropriate sized data blocks for aligned memory stores to the destination space. For one embodiment wherein sixteen bytes can be located between two adjacent memory boundaries, an appropriate sized data block would have a length of sixteen bytes for boundary aligned operations. The source data at the ending address edge is processed at block 870. In this particular case, the remaining source data is less than sixteen bytes. Thus, aligned memory operations are not automatically available and additional handling may be needed. This edge processing is further discussed below with FIG. 8D.

Figure 8B:
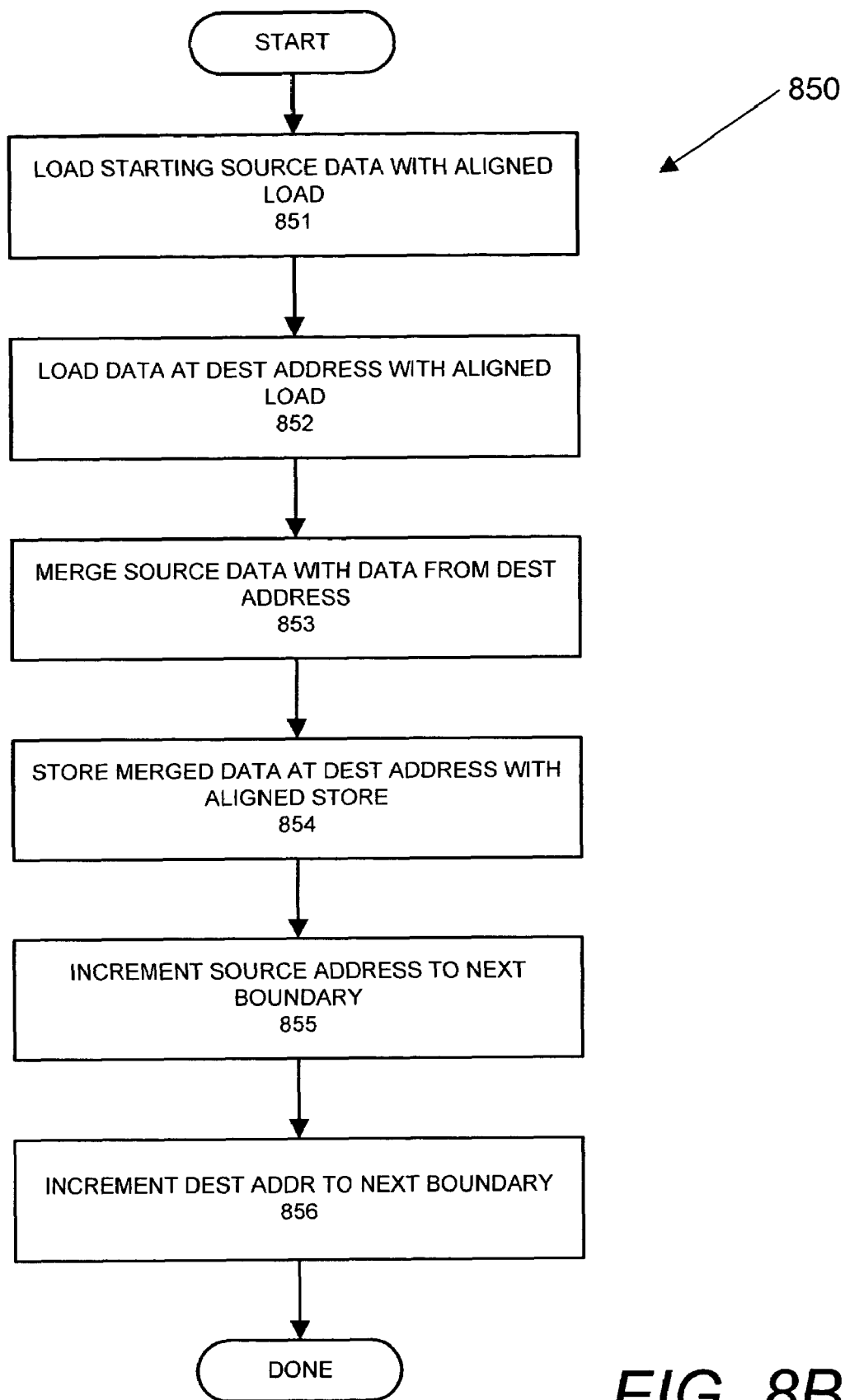

FIG. 8B is a flowchart further illustrating the processing of edge data at the starting source address as in block 850 from the embodiment of FIG. 8A. At block 851, the starting source data is loaded with an aligned memory load. For one embodiment, this memory load of sixteen bytes can also load unrelated data that reside between the nearest boundary before the starting address of the memory copy/move and the starting data itself. The data at the destination address is loaded with an aligned load at block 852. For one embodiment, this memory load involves loading unrelated data between the nearest boundary before the destination address and the destination space. However, this unrelated is preserved and unchanged. A merge operation at block 853 merges the unrelated data from before the destination space with the starting source data to form a sixteen byte data block. The merge of one embodiment packs the starting source data at the appropriate data element position based on where the destination address lines up in the sixteen byte data block. This merged data block is stored at the destination space with an aligned store operation at block 854.

In this implementation, the aligned store involves writing the merged data block starting at the nearest boundary before the destination address and wherein the unrelated data before the destination address overwrites itself. But because the unrelated data was not changed, the overwriting behaves like a data refresh. The current source address is updated at block 855 to reflect the boundary where the remaining unprocessed source data is located. As the starting source data has been loaded up to the first aligned boundary address after the starting source address, the next memory load of source data should be from that start boundary address. The current destination address is updated at block 856 to reflect the boundary of where the first available destination space is located. Similarly, the destination space has been written with starting source data up to the first aligned boundary address after the destination address. The next memory store of source data should be from that destination boundary address.

Figure 8C:
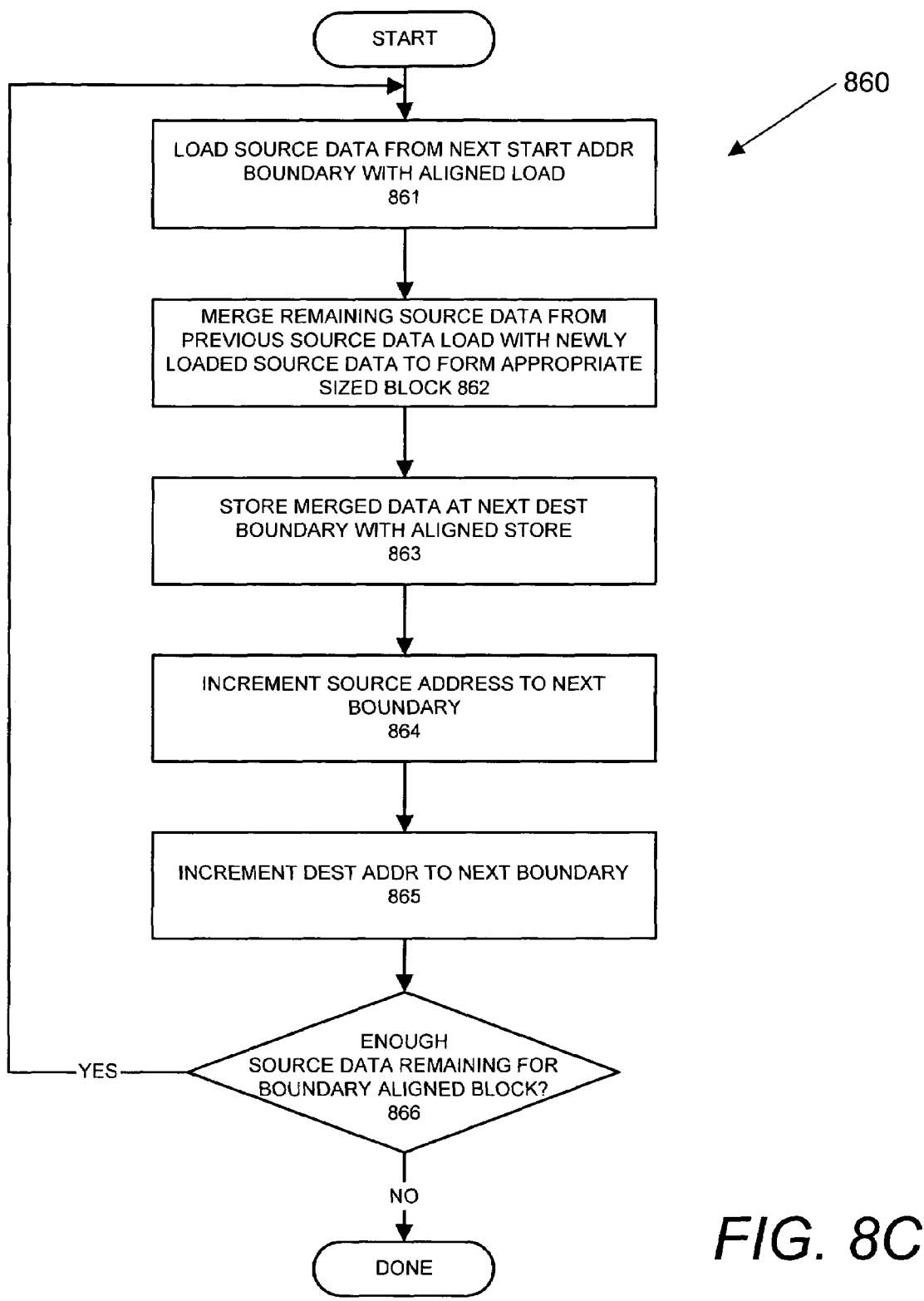

FIG. 8C is a flowchart further illustrating the processing of source data between the starting and ending edges of the source data as in block 860 from the embodiment of FIG. 8A. At block 861, unprocessed source data is loaded from the next starting address boundary with an aligned memory load. Any remaining source data from the previous source data load is merged with the newly loaded source data at block 862 to form an appropriate sized data block, sixteen bytes in length for this example. This merged data block is stored at the next destination boundary address with an aligned store at block 863. At block 864, the current source address is incremented to the next aligned memory boundary. The destination address is also incremented to the next aligned boundary in the destination space at block 865. A check is made at block 866 as to whether enough source data remains to form another boundary aligned data block. In this example, if at least sixteen source data bytes, including any data bytes not yet loaded from the source space, remain unwritten to the destination space, the flow returns to block 861 to process those source data. The check is based on sixteen bytes in this instance because another sixteen byte length would allow for another aligned memory store operation. But if less than sixteen source data bytes remain for processing, an edge condition for the end of the source data has been reached.

Figure 8D:
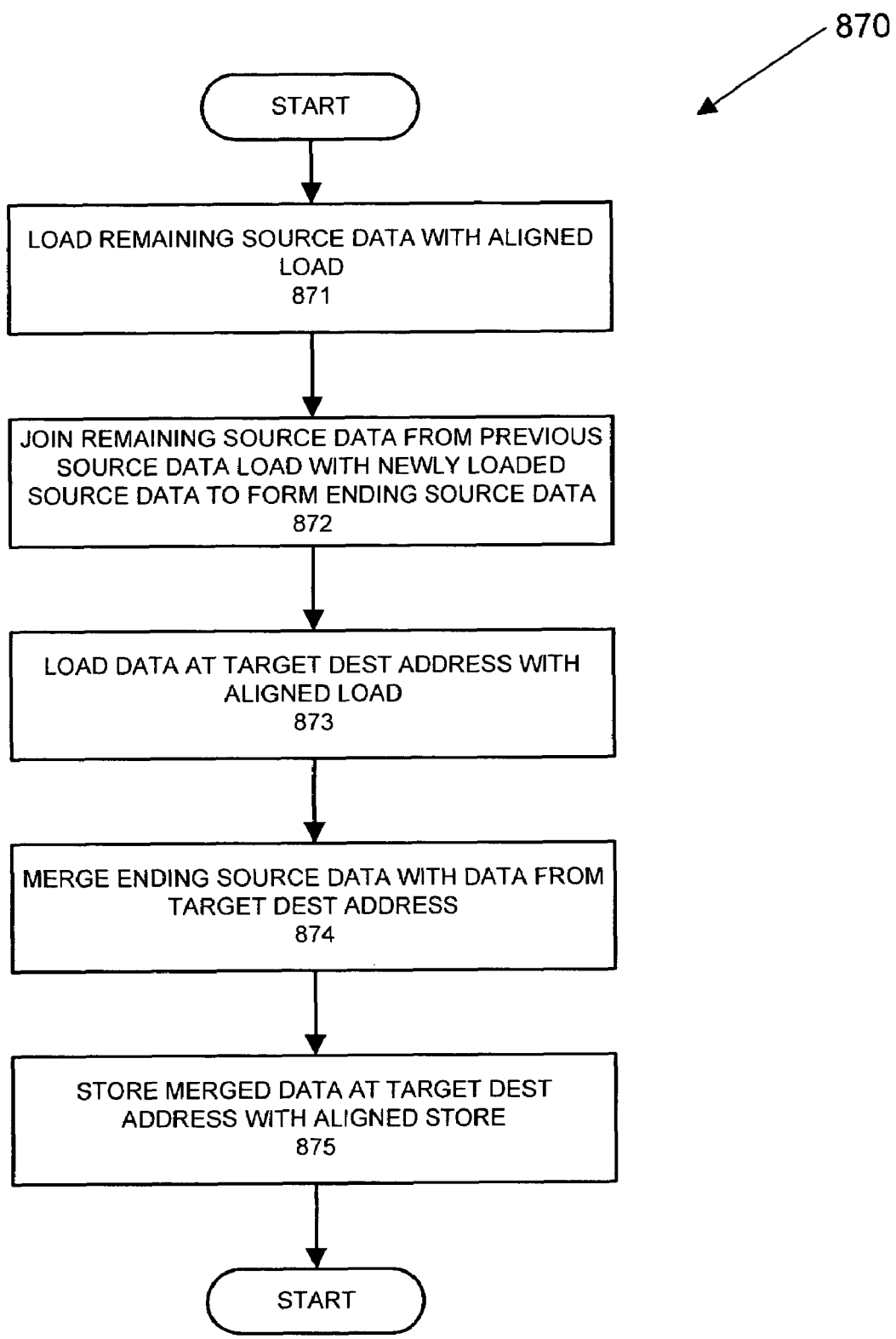

FIG. 8D is a flowchart further illustrating the processing of edge data at the remainder end of the source data as in block 870 from the embodiment of FIG. 8A. In this example, the remainder end of the source data is less than sixteen bytes. At block 871, the remaining source data is loaded from the source memory space with an aligned memory load. This remaining source data is merged at block 871 with any remaining source data from the previous source data load to form a group of ending source data. For this embodiment, these are the fifteen or less remaining source data bytes that still need to be written, but are too few to form a full boundary aligned data block. At block 873, data is loaded from the current boundary address in the destination memory space with an aligned load. For one embodiment, this memory load involves loading a block of unrelated data between the current boundary in the destination memory space and the next boundary. Note that some of the unrelated data within this block will be overwritten by the source data as this unrelated data is located within the designated target space. The unrelated data not actually designated for source data will not be modified. At block 874, the ending source data is merged with the unrelated data from the destination space to form a sixteen byte block of data wherein the remaining source data is followed by the appropriate unrelated data bytes. At block 875, the merged data block is written with an aligned store operation to the current destination boundary address. Thus the remaining source data is stored into the destination space along with the unrelated data that simply overwrites or refreshes itself.

Thus, techniques for a superior misaligned memory load and copy using merge hardware are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
   in response to receiving, in a processor, a request to perform a memory operation involving a source memory data storage location and a destination data storage location, one or more hardware execution units,
   determining whether the memory operation involves a misaligned memory address between the source data storage location and the destination data storage location;
   performing said memory operation with aligned memory if said memory operation is determined as not involving a misaligned memory address; and
   performing said memory operation with an algorithm including a merge operation and aligned memory accesses if said memory operation is determined as involving a misaligned memory address.

2. The method of claim 1 wherein said determining whether said memory operation involves a misaligned memory address comprises:
   determining whether a source memory address for said memory operation is aligned with a memory boundary; and
   determining whether a destination memory address for said memory operation is aligned with another memory boundary.

3. The method of claim 2 wherein said performing said memory operation with said algorithm comprises:
   processing first source data from a first portion of a source data block specified by said source memory address;
   processing second source data from a second portion of said source data block;
   determining whether enough unprocessed source data remains from said second portion to form a boundary aligned data block; and
   processing third source data from a third portion of said source data block if said determination indicates not enough unprocessed source data from said second portion remains.

4. The method of claim 3 wherein said processing said first source data comprises:
   loading said first source data with an aligned memory load operation;
   loading first unrelated data from a first portion of a destination space specified by said destination memory address with an aligned memory load operation;
   merging said first source data with said first unrelated data to form a first merged data block; and
   storing said first merged data block with an aligned memory store operation.

5. The method of claim 4 wherein said processing said first source data further comprises:
   incrementing said source memory address to a first next boundary in said source data block; and
   incrementing said destination memory address to a first next boundary in said destination space.

6. The method of claim 5 wherein said processing of said second source data comprises:
   loading said second source data with an aligned memory load operation;
   merging remaining first source data with said second source data to form a second merged data block having a length sufficient to fit between two consecutive boundaries; and
   storing said second merged data block with an aligned memory store operation at said first next boundary in said destination space.

7. The method of claim 6 wherein said second source data is located at said first next boundary within said source data block.

8. The method of claim 6 wherein said processing of said second source data further comprises:
   incrementing said source memory address to a second next boundary in said source data block; and
   incrementing said destination memory address to a second next boundary in said destination space.

9. The method of claim 8 wherein said processing said third source data comprises:
   loading said third source data with an aligned load operation;
   merging remaining second source data with said third source data to form a remaining source data block;
   loading second unrelated data from a second portion of said destination space with an aligned memory load operation;
   merging said remaining source data block with said second unrelated data block to form a third merged data block; and
   storing said third merged data block with an aligned memory store operation at said second next boundary in said destination space.

10. The method of claim 9 wherein said third source data is located at said second next boundary in said source data block.

11. The method of claim 1 wherein said memory operation is a memory copy.

12. The method of claim 1 wherein said memory operation is a memory move.

13. The method of claim 1 wherein said algorithm includes a packed merge instruction to cause said merge operation.

14. The method of claim 13 wherein said merge operation comprises:
   receiving a shift count of M; shifting a first operand having a first set of L data elements left by 'L-M' data elements;
   shifting a second operand having a second set of L data elements right by M data elements;
   merging said shifted first set with said shifted second set to generate a resultant having L data elements.

15. The method of claim 14 wherein said merge operation is a variable merge operation wherein said shift count can be determined at runtime.

16. The method of claim 14 wherein said merge operation is a constant merge operation wherein said shift count is fixed at code compilation.

17. A method comprising:
   evaluating a request for an unaligned memory operation having a source memory address and a destination memory address;
   loading a first portion of source data from said source memory address for said unaligned memory operation with an aligned load operation;
   loading a first boundary aligned destination data block including said destination memory address;
   determining an amount of said first portion that can fit into said first boundary aligned destination data block starting at said destination memory address;
   merging said first boundary aligned destination data block with said first portion to form a first merged data block including said determined amount of said first portion; and storing said first merged data block with an aligned store operation at an address of said first boundary aligned destination data block.

18. The method of claim 17 wherein said merging comprises:
receiving a shift count of M;
shifting a first operand having a first set of L data elements left by 'L-M' data elements;
shifting a second operand having a second set of L data elements right by M data merging said shifted first set with said shifted second set to generate a resultant having L data elements.

19. The method of claim 18 wherein said merge operation is a variable merge operation wherein said shift count can be determined at runtime.

20. The method of claim 18 further comprising:
loading a second portion of said source data with an aligned load operation;
determining whether any of said first portion of said source data has not been stored;
if said determination indicates any of said first portion has not been stored, merging any remaining unstored first portion source data with said second portion to form a second merged data block having a length sufficient to fit between two consecutive boundaries and storing said second merged data block to an address of a first boundary after said destination memory address with an aligned store operation; and
if said determination indicates all of said first portion has been stored, storing said second portion of said source data to an address of said first boundary after said destination memory address with an aligned store operation.

21. The method of claim 18 further comprising:
loading a second portion of said source data with an aligned load operation, determining whether said second portion includes sufficient data to form a boundary aligned data block;
if said determination indicates sufficient data is available in said second portion to form a boundary aligned data block, storing said second portion of said source data to an address of said first boundary after said destination memory address with an aligned store operation; and
if said determination indicates insufficient data is available in said second portion to form a boundary aligned data block, loading a second boundary aligned destination data block from said address of said first boundary after said destination memory address with an aligned store operation, merging said second portion with said second boundary aligned destination data block to form a second merged data block including entirety of said second portion and part of said second boundary aligned destination data block, and storing said second merged data block with an aligned store operation at said address of said first boundary after said destination memory address with an aligned store operation.

22. A machine readable storage medium having embodied thereon a computer program, said computer program being executable by a machine to perform a method comprising:
determining whether a memory operation involves a misaligned memory address;
performing said memory operation with aligned memory accesses if said memory operation is determined as not involving a misaligned memory address; and
performing said memory operation with an algorithm including a merge operation and aligned memory accesses if said memory operation is determined as involving a misaligned memory address.

23. The machine readable storage medium of claim 22 wherein said performing said memory operation with said algorithm comprises:
processing first source data from a first portion of a source data block specified by said source memory address;
processing second source data from a second portion of said source data block;
determining whether enough unprocessed source data remains from said second portion to form a boundary aligned data block; and
processing third source data from a third portion of said source data block if said determination indicates not enough unprocessed source data from said second portion remains.

24. The machine readable storage medium of claim 23 wherein said processing said first source data comprises:
loading said first source data with an aligned memory load operation;
loading first unrelated data from a first portion of a destination space specified by said destination memory address with an aligned memory load operation;
merging said first source data with said first unrelated data to form a first merged data block; and
storing said first merged data block with an aligned memory store operation.

25. The machine readable storage medium of claim 24 wherein said processing said first source data further comprises:
incrementing said source memory address to a first next boundary in said source data block; and
incrementing said destination memory address to a first next boundary in said destination space.

26. The machine readable storage medium of claim 25 wherein said processing of said second source data comprises:
loading said second source data with an aligned memory load operation;
merging remaining first source data with said second source data to form a second merged data block having a length sufficient to fit between two consecutive boundaries; and
storing said second merged data block with an aligned memory store operation at said first next boundary in said destination space.

27. The machine readable storage medium of claim 26 wherein said processing of said second source data further comprises:
incrementing said source memory address to a second next boundary in said source data block; and
incrementing said destination memory address to a second next boundary in said destination space.

28. The machine readable storage medium of claim 27 wherein said processing said third source data comprises:
loading said third source data with an aligned load operation;
merging remaining second source data with said third source data to form a remaining source data block;
loading second unrelated data from a second portion of said destination space with an aligned memory load operation;
merging said remaining source data block with said second unrelated data block to form a third merged data block; and storing said third merged data block with an aligned memory store operation at said second next boundary in said destination space.

29. The machine readable storage medium of claim 22 wherein said merge operation comprises:
   receiving a shift count of M;
   shifting a first operand having a first set of L data elements left by 'L-M' data elements;
   shifting a second operand having a second set of L data elements right by M data elements;
   merging said shifted first set with said shifted second set to generate a resultant having L data elements.

30. The machine readable storage medium of claim 29 wherein said memory operation is a memory copy or a memory move.

31. The machine readable storage medium of claim 30 wherein said merge operation is a variable merge operation wherein said shift count can be determined at runtime.

32. The machine readable storage medium of claim 30 wherein said merge operation is a constant merge operation wherein said shift count is fixed at code compilation.

33. An apparatus comprising:
   a hardware execution unit to execute an instruction requesting a memory operation, said instruction to cause said execution unit to:
   determine whether a memory operation involves a misaligned memory address;
   perform said memory operation with aligned memory accesses if said memory operation is determined as not involving a misaligned memory address; and
   perform said memory operation with an algorithm including a merge operation and aligned memory accesses if said memory operation is determined as involving a misaligned memory address.

34. The apparatus of claim 33 wherein said perform said memory operation with said algorithm comprises:
   processing first source data from a first portion of a source data block specified by said source memory address;
   processing second source data from a second portion of said source data block, determining whether enough unprocessed source data remains from said second portion to form a boundary aligned data block; and
   processing third source data from a third portion of said source data block if said determination indicates not enough unprocessed source data from said second portion remains.

35. The apparatus of claim 34 wherein said processing said first source data comprises:
   loading said first source data with an aligned memory load operation;
   loading first unrelated data from a first portion of a destination space specified by said destination memory address with an aligned memory load operation;
   merging said first source data with said first unrelated data to form a first merged data block; and
   storing said first merged data block with an aligned memory store operation.

36. The apparatus of claim 35 wherein said processing said first source data further comprises:
   incrementing said source memory address to a first next boundary in said source data block; and
   incrementing said destination memory address to a first next boundary in said destination space.

37. The apparatus of claim 36 wherein said processing of said second source data comprises:
   loading said second source data with an aligned memory load operation;
   merging remaining first source data with said second source data to form a second merged data block having a length sufficient to fit between two consecutive boundaries; and
   storing said second merged data block with an aligned memory store operation at said first next boundary in said destination space.

38. The apparatus of claim 37 wherein said processing of said second source data further comprises:
   incrementing said source memory address to a second next boundary in said source data block; and
   incrementing said destination memory address to a second next boundary in said destination space.

39. The apparatus of claim 38 wherein said processing said third source data comprises:
   loading said third source data with an aligned load operation;
   merging remaining second source data with said third source data to form a remaining source data block;
   loading second unrelated data from a second portion of said destination space with an aligned memory load operation;
   merging said remaining source data block with said second unrelated data block to form a third merged data block; and
   storing said third merged data block with an aligned memory store operation at said second next boundary in said destination space.

40. The apparatus of claim 39 wherein said merge operation comprises:
   receiving a shift count of M;
   shifting a first operand having a first set of L data elements left by 'L-M' data elements;
   shifting a second operand having a second set of L data elements right by M data elements;
   merging said shifted first set with said shifted second set to generate a resultant having L data elements.

41. The apparatus of claim 40 wherein said memory operation is a memory copy or a memory move.

42. The apparatus of claim 41 wherein said merge operation is a variable merge operation wherein said shift count can be determined at runtime.

43. The apparatus of claim 41 wherein said merge operation is a constant merge operation wherein said shift count is fixed at code compilation.

44. A system comprising:
   a memory to store data; and
   a processor coupled to said memory on a bus, said processor operable to process a request for a memory operation, said processor comprising:
   a bus unit to receive an instruction requesting a memory operation; and
   an execution unit coupled to said bus unit, said execution unit to execute said instruction requesting said memory operation, said instruction to cause said execution unit to:
   determine whether a memory operation involves a misaligned memory address;
   perform said memory operation with aligned memory accesses if said memory operation is determined as not involving a misaligned memory address; and
   perform said memory operation with an algorithm including a merge operation and aligned memory accesses if said memory operation is determined as involving a misaligned memory address.

45. The system of claim 44 wherein said perform said memory operation with said algorithm comprises:
- processing first source data from a first portion of a source data block specified by said source memory address;
- processing second source data from a second portion of said source data block;
- determining whether enough unprocessed source data remains from said second portion to form a boundary aligned data block; and
- processing third source data from a third portion of said source data block if said determination indicates not enough unprocessed source data from said second portion remains.

46. The system of claim 45 wherein said processing said first source data comprises:
- loading said first source data with an aligned memory load operation;
- loading first unrelated data from a first portion of a destination space specified by said destination memory address with an aligned memory load operation;
- merging said first source data with said first unrelated data to form a first merged data block;
- storing said first merged data block with an aligned memory store operation;
- incrementing said source memory address to a first next boundary in said source data block; and
- incrementing said destination memory address to a first next boundary in said destination space.

47. The system of claim 46 wherein said processing of said second source data comprises:
- loading said second source data with an aligned memory load operation;
- merging remaining first source data with said second source data to form a second merged data block having a length sufficient to fit between two consecutive boundaries;
- storing said second merged data block with an aligned memory store operation at said first next boundary in said destination space;
- incrementing said source memory address to a second next boundary in said source data block; and
- incrementing said destination memory address to a second next boundary in said destination space.

48. The system of claim 47 wherein said processing said third source data comprises:
- loading said third source data with an aligned load operation;
- merging remaining second source data with said third source data to form a remaining source data block;
- loading second unrelated data from a second portion of said destination space with an aligned memory load operation;
- merging said remaining source data block with said second unrelated data block to form a third merged data block; and
- storing said third merged data block with an aligned memory store operation at said second next boundary in said destination space.

49. The system of claim 48 wherein said merge operation comprises:
- receiving a shift count of M;
- shifting a first operand having a first set of L data elements left by 'L-M' data elements;
- shifting a second operand having a second set of L data elements right by M data elements;
- merging said shifted first set with said shifted second set to generate a resultant having L data elements.

50. The system of claim 49 wherein said memory operation is a memory copy or a memory move.

51. The system of claim 50 wherein said merge operation is a variable merge operation wherein said shift count can be determined at runtime.

52. The system of claim 50 wherein said merge operation is a constant merge operation wherein said shift count is fixed at code compilation.

* * * * *

UNITED STATES PATENT AND TRADEMARK OFFICE
CERTIFICATE OF CORRECTION

PATENT NO. : 7,340,495 B2  Page 1 of 1
APPLICATION NO. : 10/611379
DATED : March 4, 2008
INVENTOR(S) : Buxton et al.

It is certified that error appears in the above-identified patent and that said Letters Patent is hereby corrected as shown below:

In column 4, at line 63, delete "modem" and insert --modern--.

Signed and Sealed this

Eighteenth Day of November, 2008

JON W. DUDAS
*Director of the United States Patent and Trademark Office*